US012800092B2

(12) United States Patent
Chen et al.

(10) Patent No.: US 12,800,092 B2
(45) Date of Patent: Nov. 17, 2026

(54) GIMBAL STRUCTURE WITH DETACHABLE RETAINING FRAME

(71) Applicant: LIANHONG ART CO., LTD., Taoyuan City (TW)

(72) Inventors: Chia-Hui Chen, Taoyuan City (TW); Tzu-Yu Lin, Taoyuan City (TW); Ching-Jung Lai, Taoyuan City (TW); Yen-Ting Lai, Taoyuan City (TW)

(73) Assignee: LIANHONG ART CO., LTD., Taoyuan City (TW)

( * ) Notice: Subject to any disclaimer, the term of this patent is extended or adjusted under 35 U.S.C. 154(b) by 44 days.

(21) Appl. No.: 18/918,867

(22) Filed: Oct. 17, 2024

(65) Prior Publication Data

US 2026/0110389 A1 Apr. 23, 2026

(51) Int. Cl.
*F16M 11/12* (2006.01)
*F16M 11/20* (2006.01)
*G03B 17/56* (2021.01)

(52) U.S. Cl.
CPC ......... *F16M 11/123* (2013.01); *G03B 17/561* (2013.01); *F16M 11/20* (2013.01); *F16M 2200/024* (2013.01); *F16M 2200/028* (2013.01)

(58) Field of Classification Search
CPC .... G03B 17/561; F16M 11/123; F16M 11/20; F16M 2200/024; F16M 2200/028
See application file for complete search history.

(56) References Cited

U.S. PATENT DOCUMENTS 6,991,384 B1 * 1/2006 Davis .................. F16M 11/041 396/428
7,549,807 B2 * 6/2009 Nazarian .............. G03B 17/563 396/420

(Continued)

FOREIGN PATENT DOCUMENTS

CN 220118996 U 12/2023
CN 220623468 U 3/2024

(Continued)

OTHER PUBLICATIONS

PCT search report dated Mar. 4, 2025 of the corresponding PCT patent application No. PCT/CN2024/114523.

*Primary Examiner* — Twyler L Haskins
*Assistant Examiner* — John H Morehead, III
(74) *Attorney, Agent, or Firm* — HDLS IPR SERVICES; Chun-Ming Shih

(57) ABSTRACT

A gimbal structure with a detachable retaining frame is provided for carrying a photography device which includes a camera body and a lens, the gimbal structure includes a fixing bracket, a rotating base and one or more detachable retaining frames, the fixing bracket includes an arc rail slot; the rotating base includes a mounting platform for mounting the photography device and an arc slide rail connected to the mounting platform, a part of the arc slide rail rotatably slides in the arc rail slot and drives the mounting platform to rotate altogether, the arc slide rail is outside the lens and has a mounting surface arranged relative to the camera body, the arc slide rail has two ends and a spacing between the two ends; a detachable retaining frame has an end detachably connected to the mounting surface and another end provided for blocking the camera body.

11 Claims, 26 Drawing Sheets

(56) References Cited

U.S. PATENT DOCUMENTS 8,345,154 B2 * 1/2013 Zhan .................. F16M 11/2007
348/375
8,774,618 B1 * 7/2014 Muzila ................... F16M 11/10
396/198
10,281,803 B2 * 5/2019 Johnson, Sr. ........ F16M 11/041
10,578,953 B1 * 3/2020 Hallett ............... F16M 11/2092
10,775,683 B1 * 9/2020 Hallett ................... F16M 11/24
2004/0036841 A1 * 2/2004 Dbjay .................... G03B 37/00
352/243
2013/0236235 A1 * 9/2013 Johnson, Sr. ........... F16C 11/04
403/53
2014/0076192 A1 * 3/2014 Hurd ......................... B61B 9/00
104/165
2015/0234258 A1 * 8/2015 Hida .................... F16M 11/045
396/428
2020/0409241 A1 * 12/2020 Iinuma ................. H04N 23/663
2021/0144309 A1 5/2021 Tang et al.
2023/0353861 A1 * 11/2023 Nordquist .............. F16M 11/18
2025/0044668 A1 * 2/2025 Lin ...................... G03B 17/561

FOREIGN PATENT DOCUMENTS

EP 3127819 A1 2/2017
EP 3163145 A1 * 5/2017 ........... G03B 17/561
TW I767854 B 6/2022
TW M663368 U 11/2024

* cited by examiner

GIMBAL STRUCTURE WITH DETACHABLE RETAINING FRAME

BACKGROUND OF THE DISCLOSURE

Technical Field

The present disclosure relates to a gimbal structure used for carrying a photography device and providing a multi-angle rotation adjustment function, particularly relates to a gimbal structure with a detachable retaining frame.

Description of Related Art

Photography devices such as mobile phones, monocular cameras, digital cameras or camcorders are widely used in daily life. In order to avoid the imaging quality from being affected by hand tremor or shaking when taking pictures, it is common to mount the photography device on a tripod head of a tripod to ensure that the photography device is able to achieve a smooth and stable shooting effect.

A gimbal structure with the function of adjusting the angle of the photography device is commercially available on the market, which mainly includes a base fixed to the tripod and a rotating stand capable of rotating relative to the base. The rotating stand has a rotatable slide rail that slides and rotates relative to the base and a mounting platform that operates based on the rotation of the rotatable slide rail, and the photography device is locked to the mounting platform to achieve the function of adjusting the angle of the tripod through the rotating stand.

However, the aforementioned rotating stand is only fixed by the mounting platform and the photography device without any other points of support, thus having the following problems: Firstly, the rotating stand and the photography device only have a single fixed point, causing an instability issue that the photography device is easy to shake. Secondly, the photography device is easy to shake, resulting in the rotation of the photography device that causes the photography device to loosen from the fixing bracket, and even to fall off from the rotating stand.

In view of these problems, the discloser of the present disclosure conducted extensive research and experiment and developed the present disclosure to solve the above-mentioned problem, which is the goal of the discloser's improvement.

SUMMARY OF THE DISCLOSURE

The present disclosure provides a gimbal structure with a detachable retaining frame, and one end of the detachable retaining frame is detachably connected to a mounting surface and another end of the detachable retaining frame is used for blocking a camera body to achieve a gimbal structure with the advantages of fixing the photography device stably and preventing the photography device from shaking, spinning or falling.

In some embodiments of the present disclosure, the present disclosure provides a gimbal structure with a detachable retaining frame, which is used for carrying a photography device, the photography device includes a camera body and a lens, the gimbal structure includes: a fixing bracket, having an arc rail slot; a rotating base, including a mounting platform and an arc slide rail connected to the mounting platform, the mounting platform being provided for mounting the photography device, a part of the arc slide rail rotatably sliding in the arc rail slot and driving the mounting platform to rotate altogether, the arc slide rail is arranged outside the lens and having a mounting surface configured relative to the camera body, the arc slide rail having two ends and a spacing defined between the two ends; and at least one detachable retaining frame, having an end detachably connected to the mounting surface and another end used for blocking the camera body.

Based on the above, one or more detachable retaining frames are installed on the arc slide rail for blocking the camera body, and the number of fixed points between the arc slide rail and the photography device is increased by means of the detachable retaining frame, so as to overcome the drawbacks of the related art that only uses the arc slide rail to fix the photography device and causes the problems that the photography device will shake or spin easily, and to achieve the gimbal structure of the present disclosure with the advantages of fixing the photography device stably and preventing the photography device from shaking, spinning or falling.

DETAILED DESCRIPTION

Figure 1:
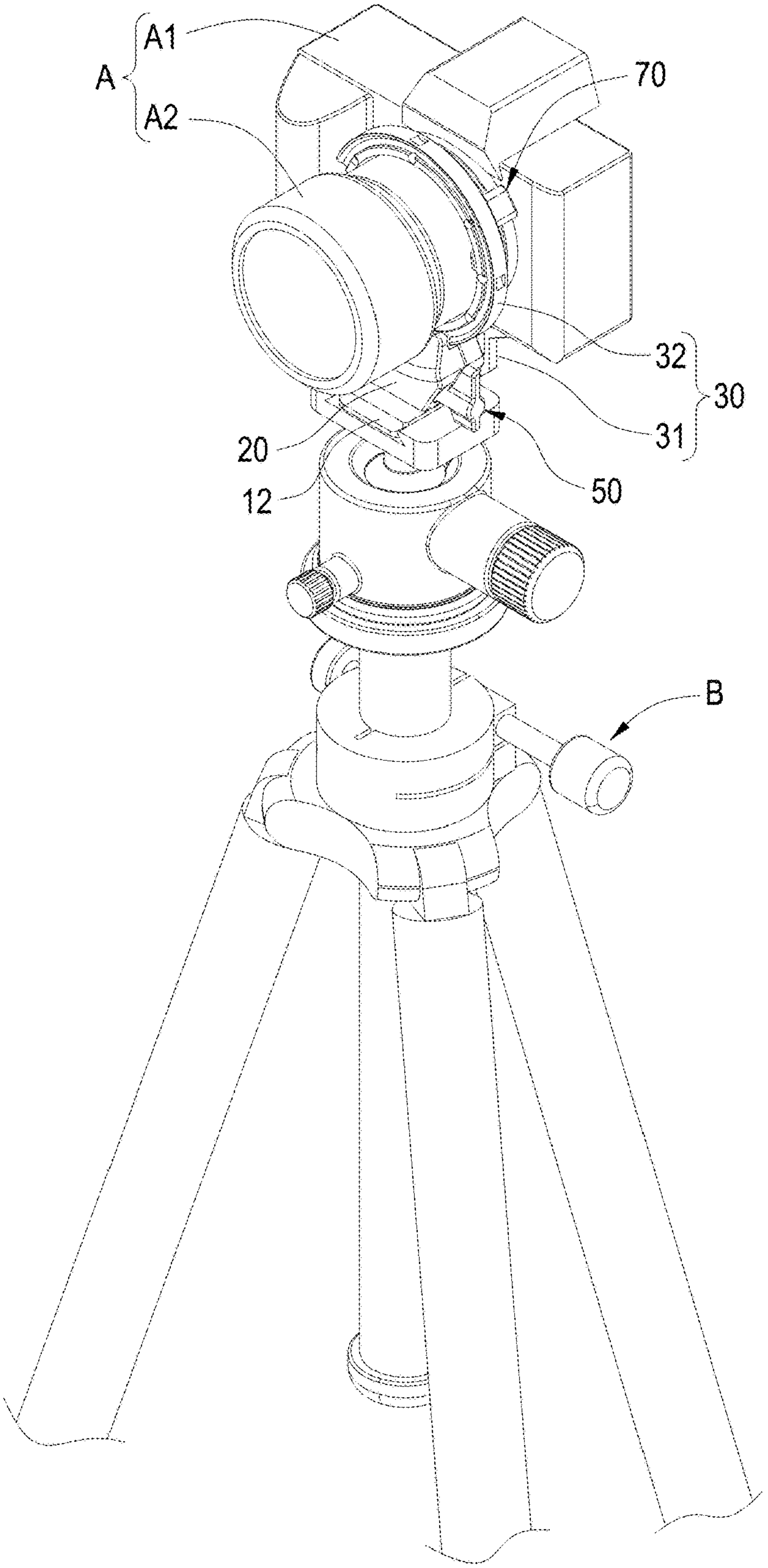
FIG. 1 is a perspective view of the gimbal structure installed to the tripod in accordance with the first embodiment of the present disclosure.

The detailed description and technical contents of the present disclosure are illustrated in the following diagrams, which are for illustrative purposes only and are not intended to limit the present disclosure.

With reference to FIGS. 1 to 10, the present disclosure provides a gimbal structure with a detachable retaining frame, which is used for carrying a photography device A and fixable onto a tripod B, the photography device A is a camera including a camera body A1 and a lens A2. In FIGS. 1 to 10, the gimbal structure in accordance with the first embodiment of the present disclosure mainly includes a fixing bracket 10, a rotating base 30 and one or more detachable retaining frames 70.

In FIGS. 1 to 10, the fixing bracket 10 is provided with an arc rail slot 13, and the fixing bracket 10 includes a first clamping plate 11 and an adapter plate 12 perpendicularly connected, and a second clamping plate 20 positioned and configured relative to the first clamping plate 11. In this embodiment, the adapter plate 12 is horizontally installed, and the first clamping plate 11 is perpendicularly installed on a side of the adapter plate 12, but the present disclosure is not limited to such arrangement. The adapter plate 12 is mounted on the tripod B for fixing the gimbal structure of the present disclosure. In this embodiment, the adapter plate 12 is in a rectangular shape, but the present disclosure is not limited to such arrangement, and the shape of the adapter plate 12 may be adjusted according to different installation interfaces of the tripod B. The first clamping plate 11 has a first arc clamping groove 111. In this embodiment, the first arc clamping groove 111 is in an arc shape and arranged at the top edge of the front side of the first clamping plate 11.

In this embodiment, the first clamping plate 11 and second clamping plate 20 are combined with each other by means of a stud (not shown in the figures) and a nut (not shown in the figures) to prevent the second clamping plate 20 from separating from the first clamping plate 11, but the present disclosure is not limited to such arrangement. The second clamping plate 20 has a second arc clamping groove 22, and the second arc clamping groove 22 is also in an arc shape corresponding to the shape of the first arc clamping groove 111 and arranged at the top edge of the rear side of the second clamping plate 20, and the first arc clamping groove 111 and the second arc clamping groove 22 are configured symmetrically with respect to each other to form an arc rail slot 13.

In FIGS. 1 to 10, the rotating base 30 includes a mounting platform 31 and an arc slide rail 32 connected to the mounting platform 31, the mounting platform 31 is provided for mounting a camera body A1 of a photography device A, and a long strip hole 311 perpendicularly penetrates through the mounting platform 31 and is provided for passing a bolt 60A to lock the photography device A to fix the photography device A onto the mounting platform 31.

Figure 9:
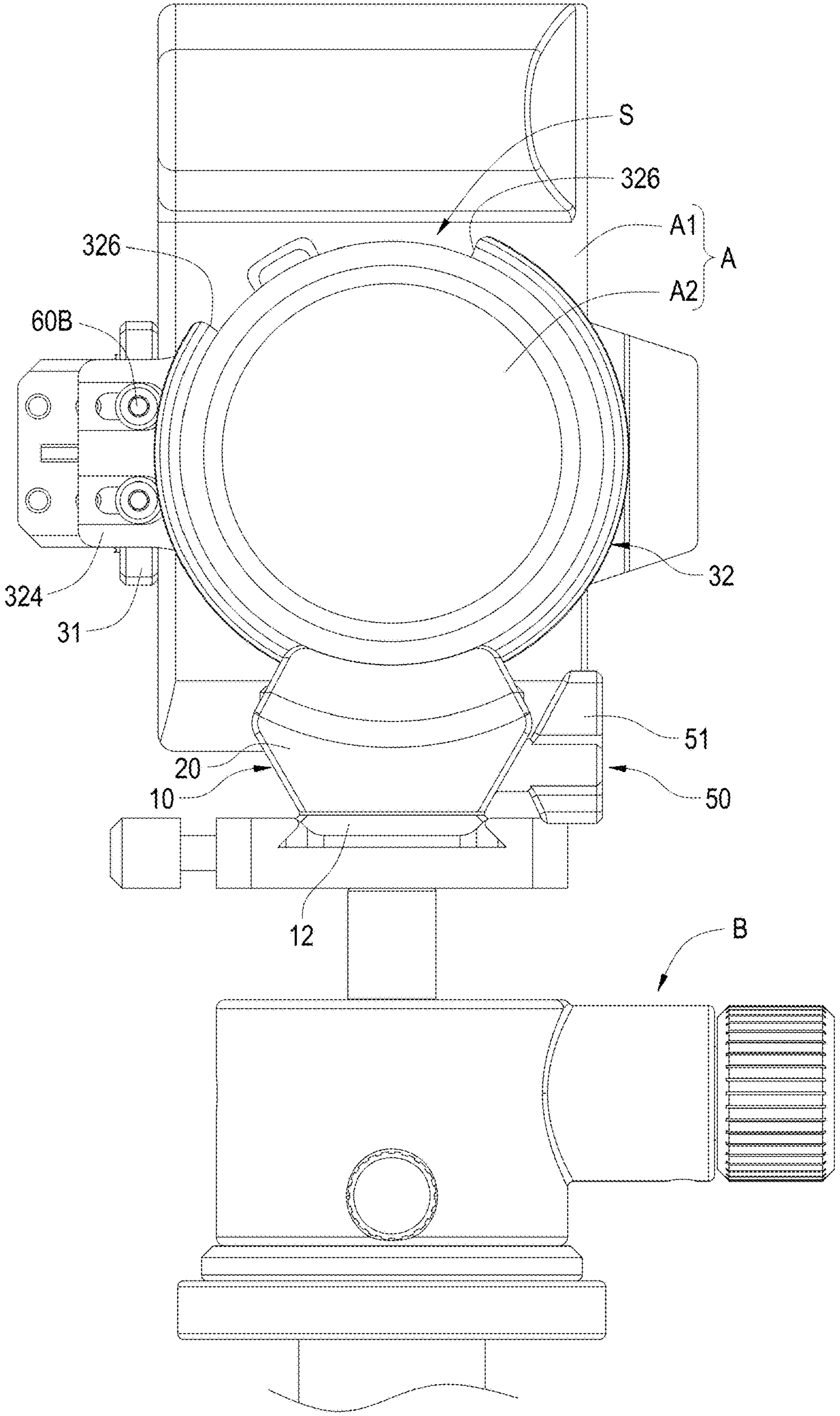
FIG. 9 is another front view showing the using status of the gimbal structure of the first embodiment of the present disclosure.
Figure 10:
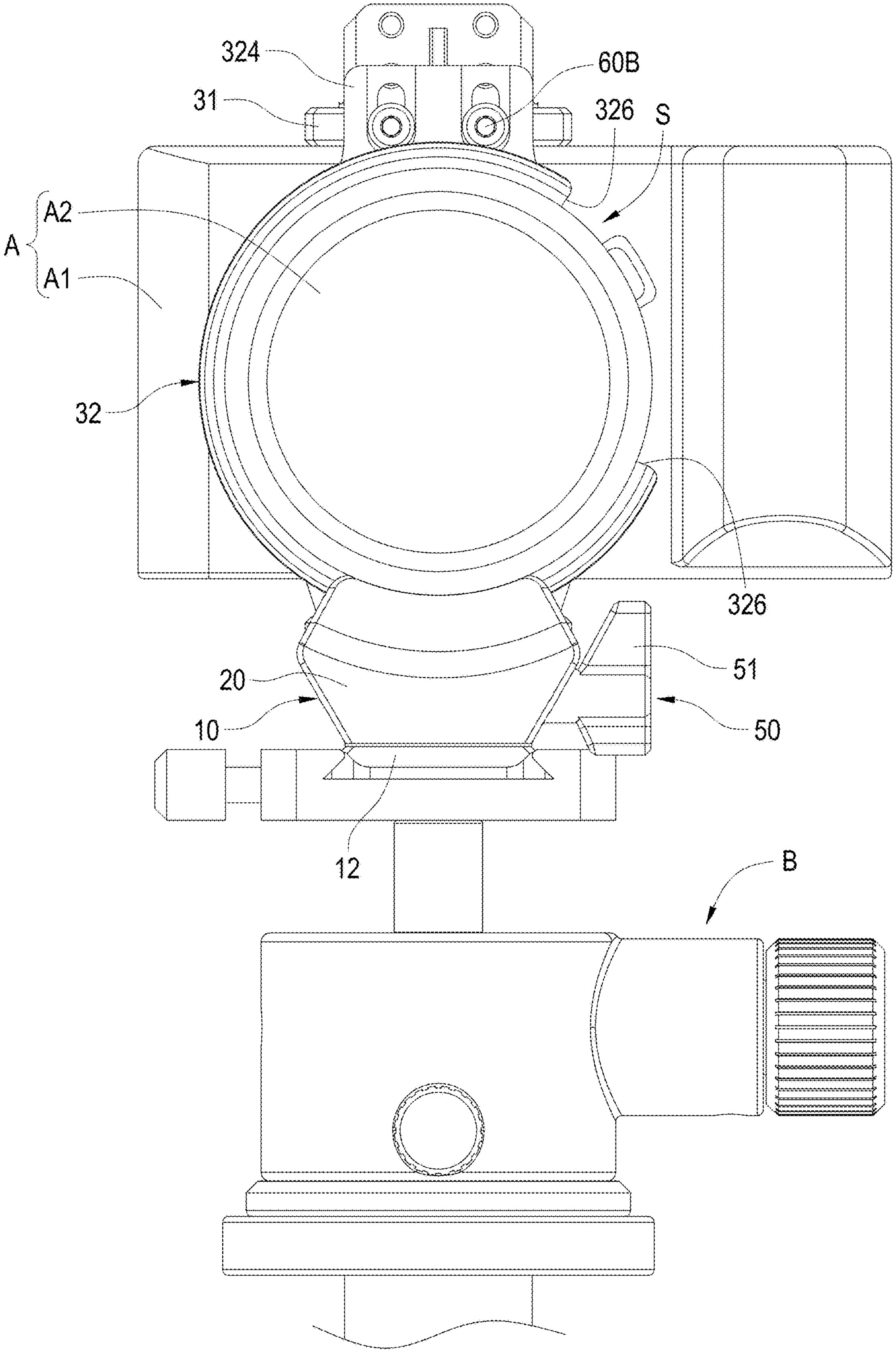
FIG. 10 is a further front view showing the using status of the gimbal structure of the first embodiment of the present disclosure.

In addition, the arc slide rail 32 is perpendicularly connected to the front end of the mounting platform 31, that is, the plane formed by the sliding trajectory of arc slide rail 32 is perpendicular to the mounting platform 31, such that the arc slide rail 32 is used to fix a lens A2 of the photography device A. In this embodiment as shown in FIGS. 9 and 10, a plurality of bolts 60B passes through an installation part 324 of the arc slide rail 32 and is locked to the front side of the mounting platform 31 to fix the arc slide rail 32 to the mounting platform 31.

In addition, a part of the arc slide rail 32 rotatably slides in the arc rail slot 13 and drives the mounting platform 31 to rotate altogether, so that the rotating base 30 is configured on the fixing bracket 10, the arc slide rail 32 is configured outside the lens A2 and has a mounting surface 325 configured relative to the camera body A1, the arc slide rail 32 has two ends 326 and a spacing S defined between the two ends 326.

In this embodiment, the arc slide rail 32 is a C-shaped ring with the spacing S at two ends separately, but the present disclosure is not limited to such arrangement. For example, the arc slide rail 32 may be in a semi-arc shape with the spacing S at two ends separately, therefore, as long as the arc slide rail 32 has two ends with the spacing S separately, it should fall within the scope of protection of the present disclosure.

Figure 3:
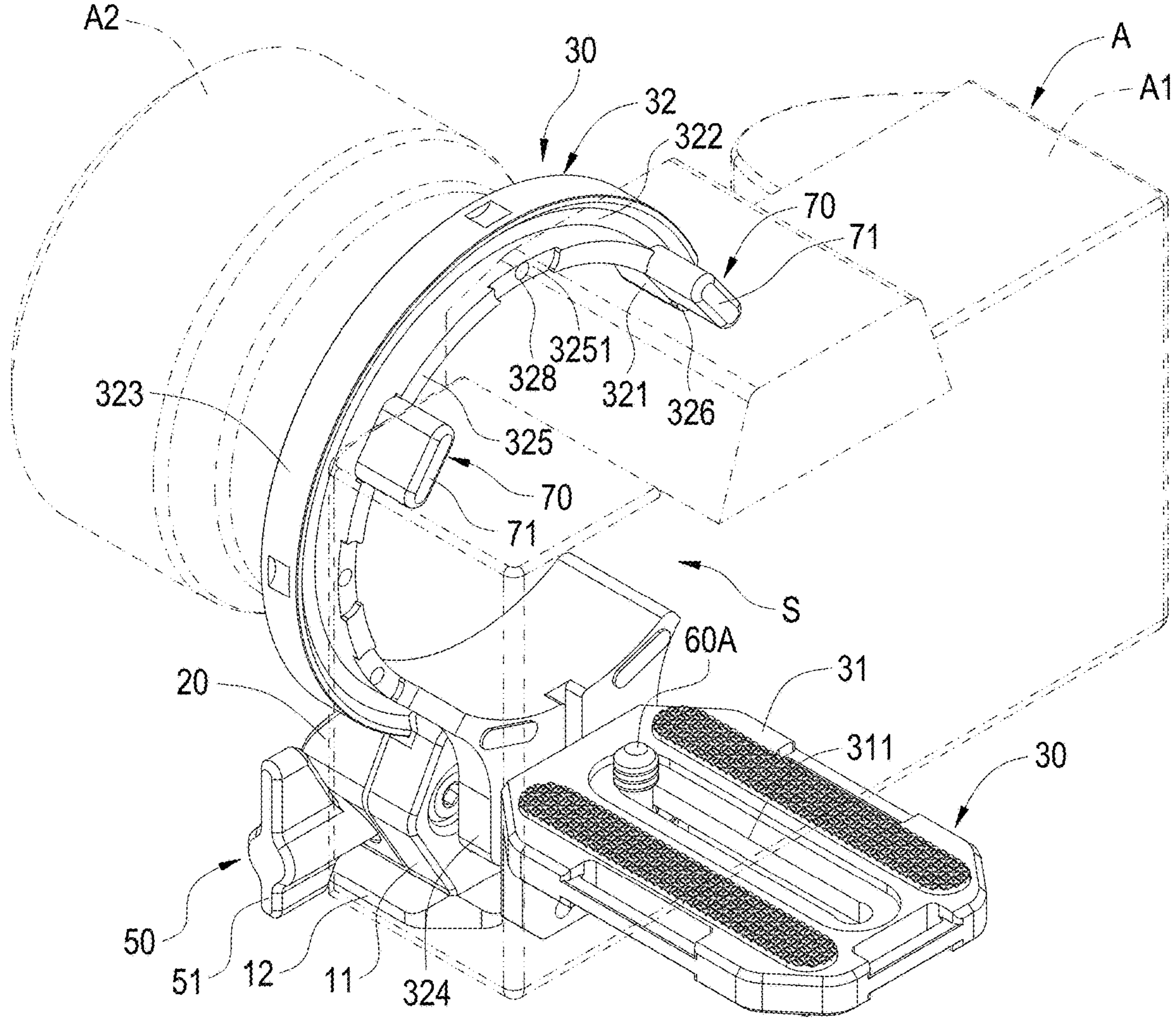
FIG. 3 is a perspective view of the gimbal structure of the first embodiment of the present disclosure.
Figure 4:
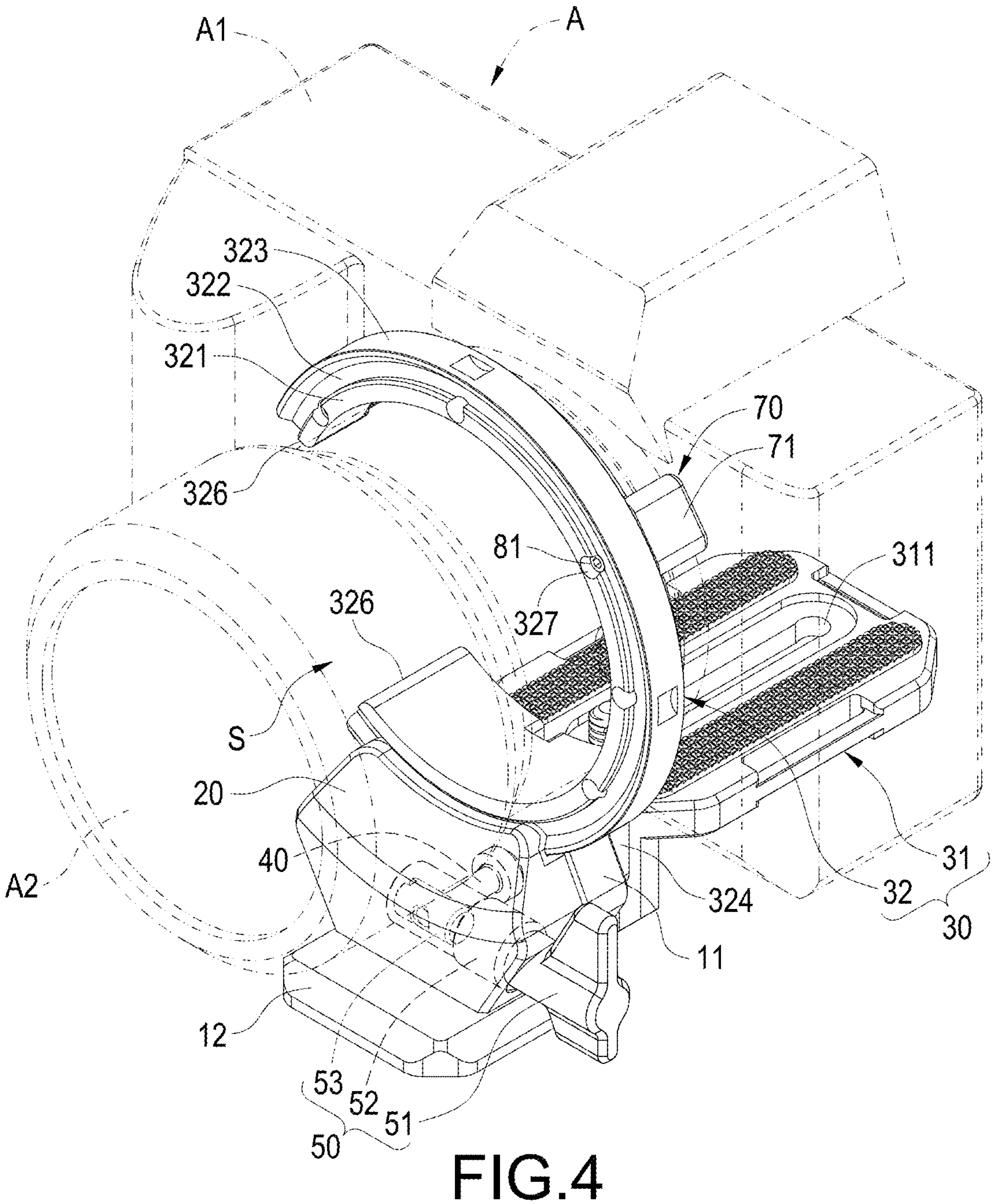
FIG. 4 is another perspective view of the gimbal structure of the first embodiment of the present disclosure.
Figure 5:
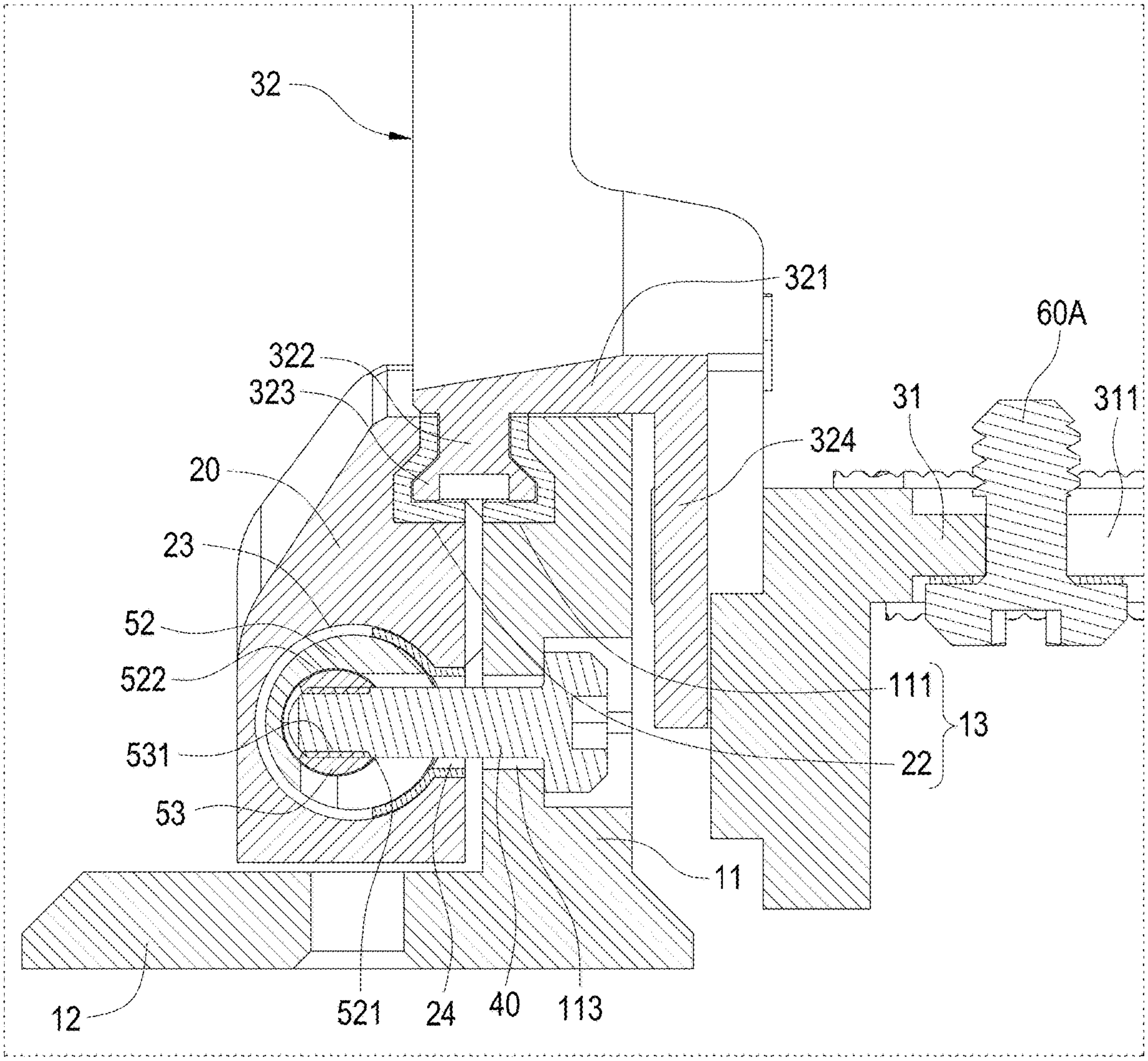
FIG. 5 is a cross-sectional view of the gimbal structure of the first embodiment of the present disclosure.
Figure 6:
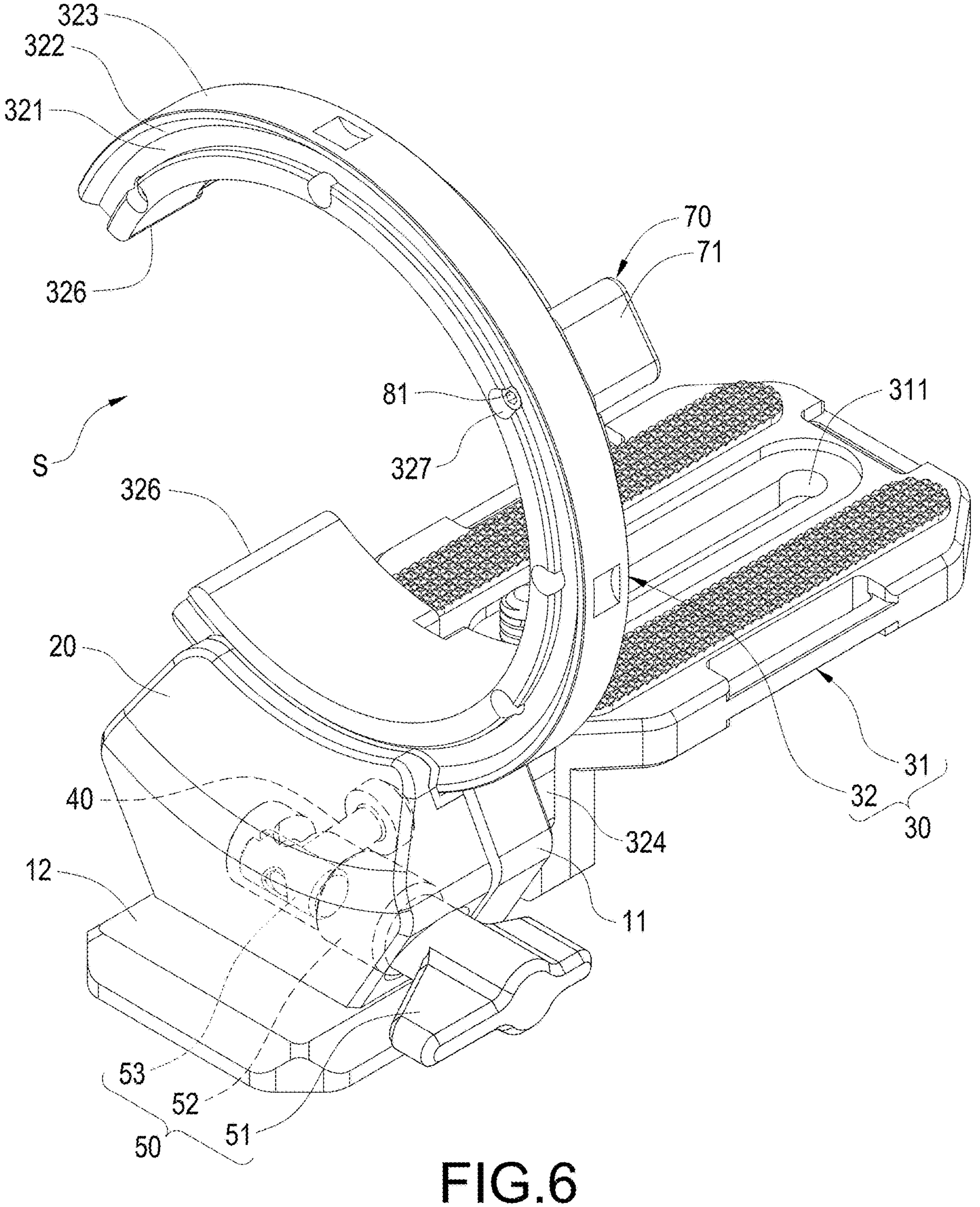
FIG. 6 is a perspective view showing the using status of the gimbal structure of the first embodiment of the present disclosure.
Figure 7:
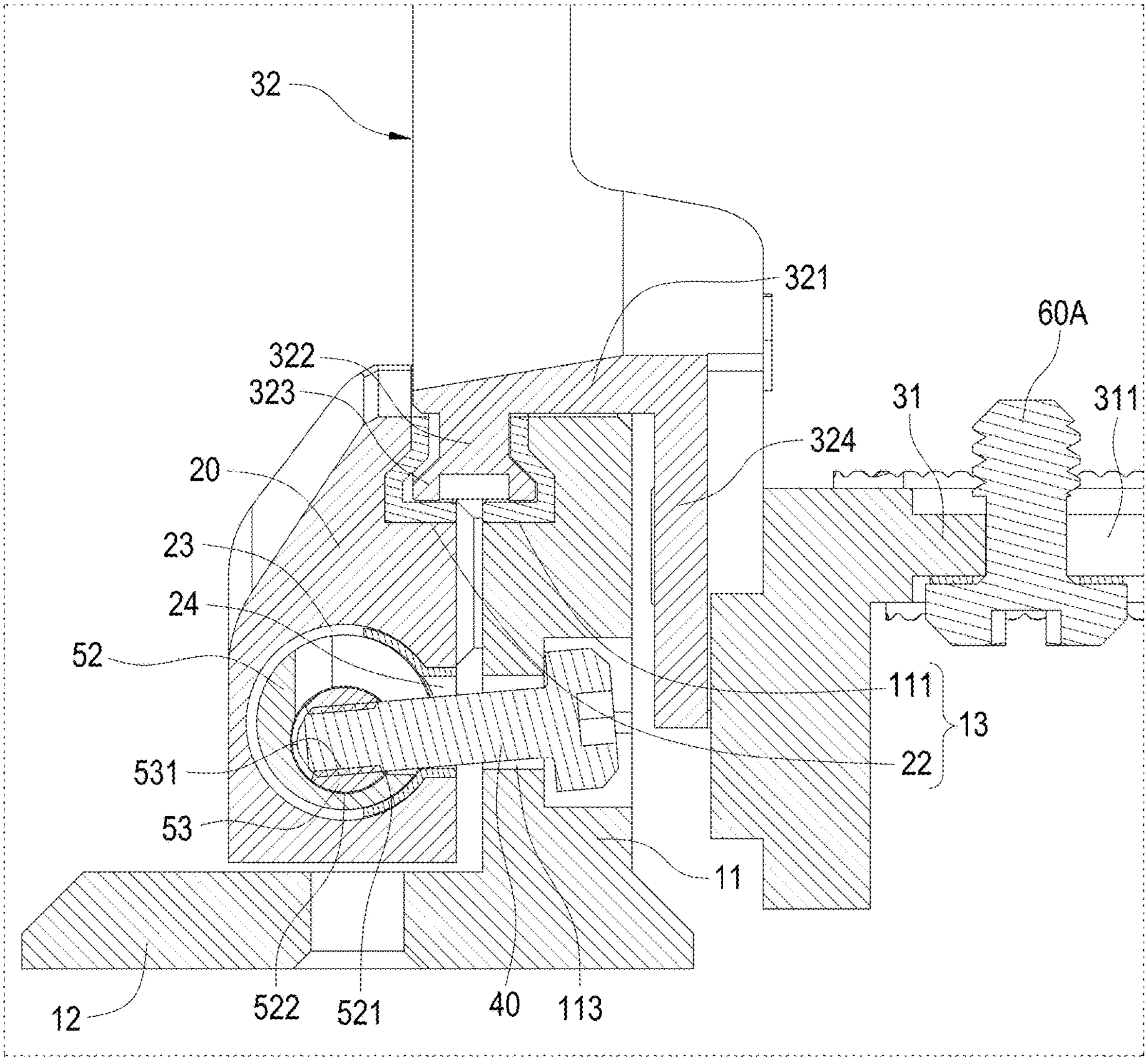
FIG. 7 is a cross-sectional view showing the using status of the gimbal structure of the first embodiment of the present disclosure.

In FIGS. 2 to 7, the arc slide rail 32 includes a body part 321, a connection part 322, a limiting part 323 and an installation part 324, the connection part 322 extends outward from a part of the outer edge of the body part 321 and is connected to the limiting part 323, the cross-sectional width of the connection part 322 is smaller than the cross-sectional width of the body part 321, the limiting part 323 gradually extends outward from an end of the connection part 322, that is the limiting part 323 as shown in FIGS. 5 and 7 is in that shape of a trapezium. The shape of the first arc clamping groove 111 and the second arc clamping groove 22 is configured corresponding to the shape of the connection part 322 and the limiting part 323, so that the first arc clamping groove 111 and the second arc clamping groove 22 are capable of clamping the arc slide rail 32. The installation part 324 extends outward from the rear side of the body part 321 to form an inverted L-shape, for mounting and fixing the front end of the mounting platform 31.

In FIGS. 2 to 4 and 6, there are a multiple of detachable retaining frames 70 in this embodiment, but the present disclosure is not limited to such arrangement, and the quantity of the detachable retaining frames 70 may also be one, an end of each detachable retaining frame 70 is mounted to the mounting surface 325, or detached from the mounting surface 325 and another end of each detachable retaining frame 70 is provided for abutting and blocking the camera body A1.

The mounting surface 325 of the arc slide rail 32 is provided with a plurality of positioning notches 3251, the detachable retaining frame 70 includes a main body block 71 detachably connected to the mounting surface 325, the main body block 71 is selectively embedded into one of the positioning notches 3251, that is, the main body block 71 may be embedded arbitrarily into any one of the positioning notches 3251.

In this way, the arc slide rail 32 has a detachable retaining frame 70 installed with one or more for blocking camera body A1, the number of fixed points between the arc slide rail 32 and the photography device A is increased by means of the detachable retaining frame 70 to improve the related art that only relies on the arc slide rail itself to be fixed to the photography device, which will cause the photography device to shake or spin easily, and to achieve the gimbal structure of the present disclosure with the advantages of fixing the photography device stably and preventing the photography device from shaking, spinning or falling.

In addition, a spacing S is defined between two ends 326 of the arc slide rail 32, users may adjust the shortcut keys on the camera body A1 or the lens A2 to be corresponding to the spacing S to avoid the shortcut keys on the camera body A1 or lens A2 from being blocked by the arc slide rail 32, and to improve the convenience of use of the gimbal structure of the present disclosure.

Figure 2:
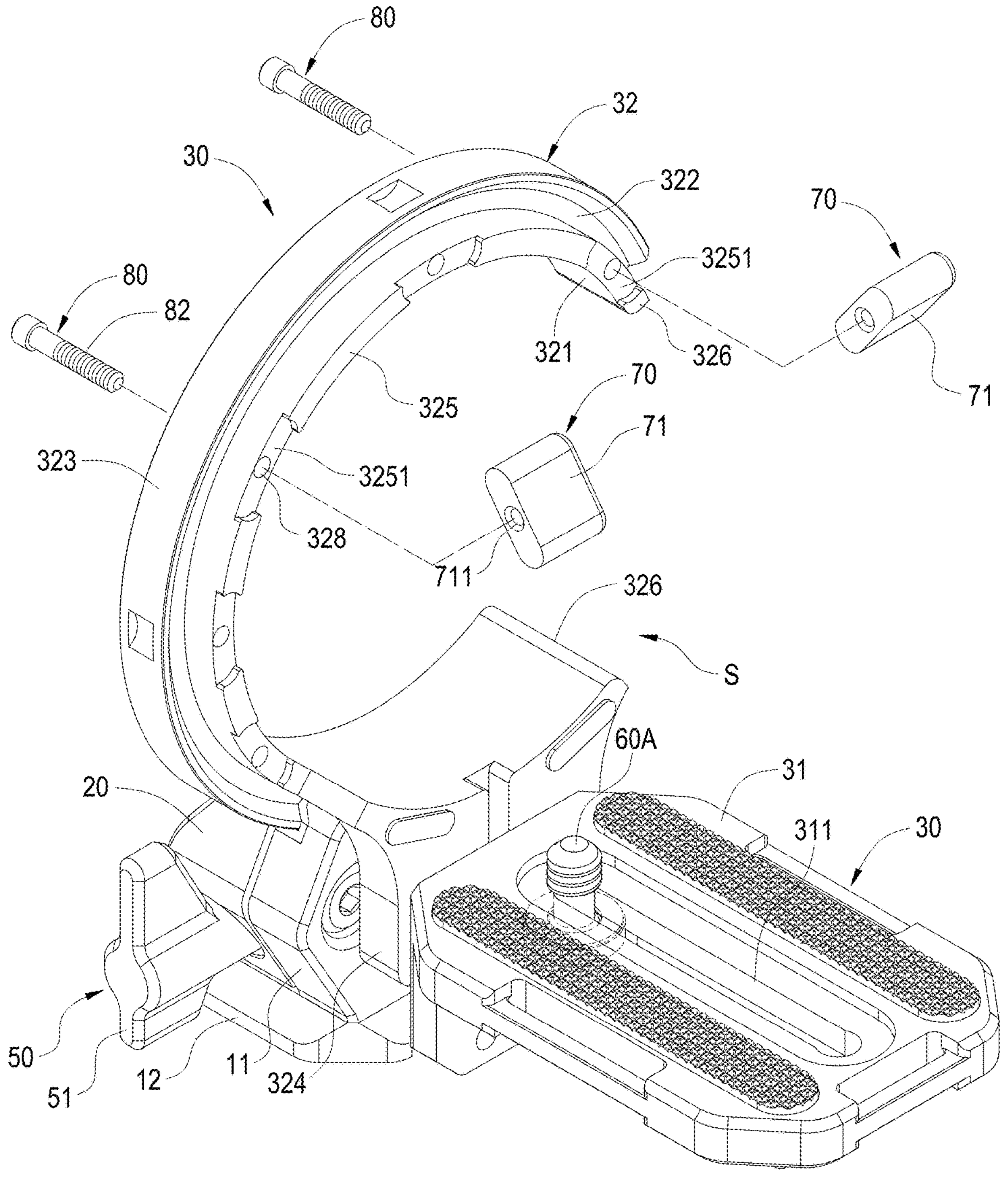
FIG. 2 is a disassembled view of the gimbal structure of the first embodiment of the present disclosure.

In FIGS. 2 to 4, the gimbal structure of the present disclosure further includes one or more screws 80, and there are a multiple of screws 80 in this embodiment, but the present disclosure is not limited to such arrangement and the quantity of screws 80 may be one, the arc slide rail 32 is provided with a plurality of countersinks 327 and a plurality of first locking holes 328 extending from the bottom wall of each positioning notch 3251 and communicating to each other, each main body block 71 has a second locking hole 711, each screw 80 has a head 81 and a shaft 82, the head 81 is buried into one of the countersinks 327 to prevent the photography device A from being scratched by the head 81 protruded from the arc slide rail 32, the shaft 82 passes through and is fixed to one of the first locking hole 328 and second locking hole 711, such that the main body block 71 may be assembled to or removed from the positioning notch 3251.

In addition, with the screw 80 and the plurality of positioning notches 3251, the users may assemble or remove the detachable retaining frame 70 and set the quantity and position of the detachable retaining frames 70 on their own, so as to allow the detachable retaining frame 70 to be used extensively in various photography devices A of different models, and to improve the convenience of use of the gimbal structure of the present disclosure.

In FIGS. 4 to 7, the gimbal structure of the present disclosure further includes a pressing part 40 and an adjustment component 50, the pressing part 40 passes through and is connected to the first clamping plate 11 and the second clamping plate 20 of the fixing bracket 10. The adjustment component 50 is installed to the second clamping plate 20 and connected to the pressing part 40. The adjustment component 50 is toggleable between an unlocked position and a locked position to allow the pressing part 40 to release or press the first clamping plate 11 and the second clamping plate 20 of the fixing bracket 10, so as to allow the arc slide rail 32 to slide between the first arc clamping groove 111 and the second arc clamping groove 22 or to be clamped tightly between the first arc clamping groove 111 and the second arc clamping groove 22, and achieve the effect of making a multi-angle rotational adjustment of the rotating base 30 quickly and easily.

In FIGS. 4 to 7, the adjustment component 50 of this embodiment includes a knob 51, a socket 52 and a positioning pin 53. The knob 51 is connected and fixed to an end of the socket 52. The socket 52 has a gap 521 and a blind hole 522 communicating to each other. In an embodiment, the blind hole 522 extends inward from an end surface of another end and configured eccentrically with the socket 52, that is, the center of the blind hole 522 and the center of the socket 52 are situated at different positions, the gap 521 extends inward from a side edge of the socket 52 and communicates with the blind hole 522. The positioning pin 53 is snapped in the blind hole 522, and a side edge of the positioning pin 53 is provided with a screw hole 531 corresponding to the gap 521. In this way, when the knob 51 is turned, the socket 52 is rotated to drive the positioning pin 53 inside the socket 52 to rotate altogether.

In addition, the first clamping plate 11 has a first through slot 113, and the second clamping plate 20 has a compartment 23 and a second through slot 24 communicating to each other. In an embodiment, the first through slot 113 is a strip slot extending perpendicularly and passing longitudinally through the first clamping plate 11, the compartment 23 extends inward from a sidewall of the second clamping plate 20, the second through slot 24 is a strip slot extending inward from the rear side of the second clamping plate 20, communicating with the compartment 23, and corresponding to the first through slot 113. The socket 52 is rotatably plugged into the compartment 23, and the knob 51 is exposed to the outside of the second clamping plate 20. In this embodiment, the pressing part 40 is a shoulder bolt. The pressing part 40 passes through a first through slot 113, a second through slot 24 and a gap 521 sequentially from the rear side of the first clamping plate 11 and is screwed and fixed to the screw hole 531 of the positioning pin 53.

In FIGS. 4 and 5, when the adjustment component 50 is situated at the locked position, the positioning pin 53, the first through slot 113 and the second through slot 24 are all located on the same horizontal line, so that the pressing part 40 is in a horizontal status and presses the second clamping plate 20 towards the first clamping plate 11 to clamp and fix the arc slide rail 32 into the arc rail slot 13 to fix the rotating base 30. In FIGS. 6 and 7, when the knob 51 is turned 90 degrees counterclockwise, the adjustment component 50 is situated at the unlocked position, the positioning pin 53 and the socket 52 are eccentrically configured, so that the positioning pin 53 is changed to be lower than the first through slot 113 and the second through slot 24, and the pressing part 40 will be rotated counterclockwise as well and will follow the counterclockwise rotation and tilt upward along the strip groove of the first through slot 113 and the strip groove of the second through slot 24, so as to release the pressing of the second clamping plate 20 and the first clamping plate 11 and allow the arc slide rail 32 to slide in the gap between the first arc clamping groove 111 and the second arc clamping groove 22 in order to adjust the angle of the rotating base 30.

Figure 8:
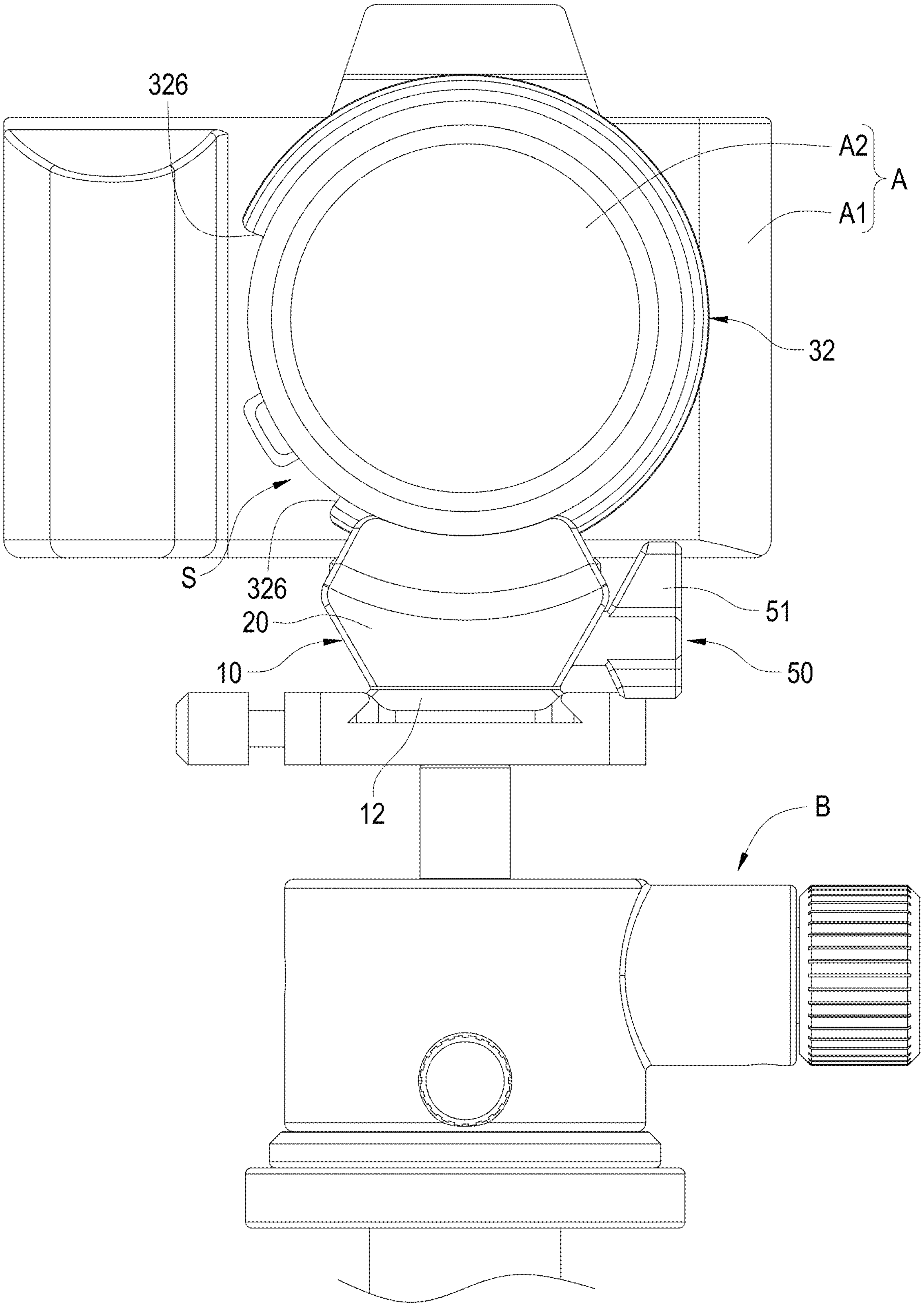
FIG. 8 is a front view showing the using status of the gimbal structure of the first embodiment of the present disclosure.

In this way, the gimbal structure of the present disclosure is capable of quickly adjusting the fixed angle of the rotating base 30 by means of the adjustment component 50 and the pressing part 40, and allowing the rotating base 30 to rotate and to be fixed at a desired angle as needed, so as to facilitate users to take pictures. With reference to FIGS. 8 and 9 for the schematic views of the rotating base 30 before/after being rotated 90 degrees respectively, it is noteworthy that the rotating angle of the gimbal structure of the present disclosure is not limited to the angle disclosed in the figures.

Figure 11:
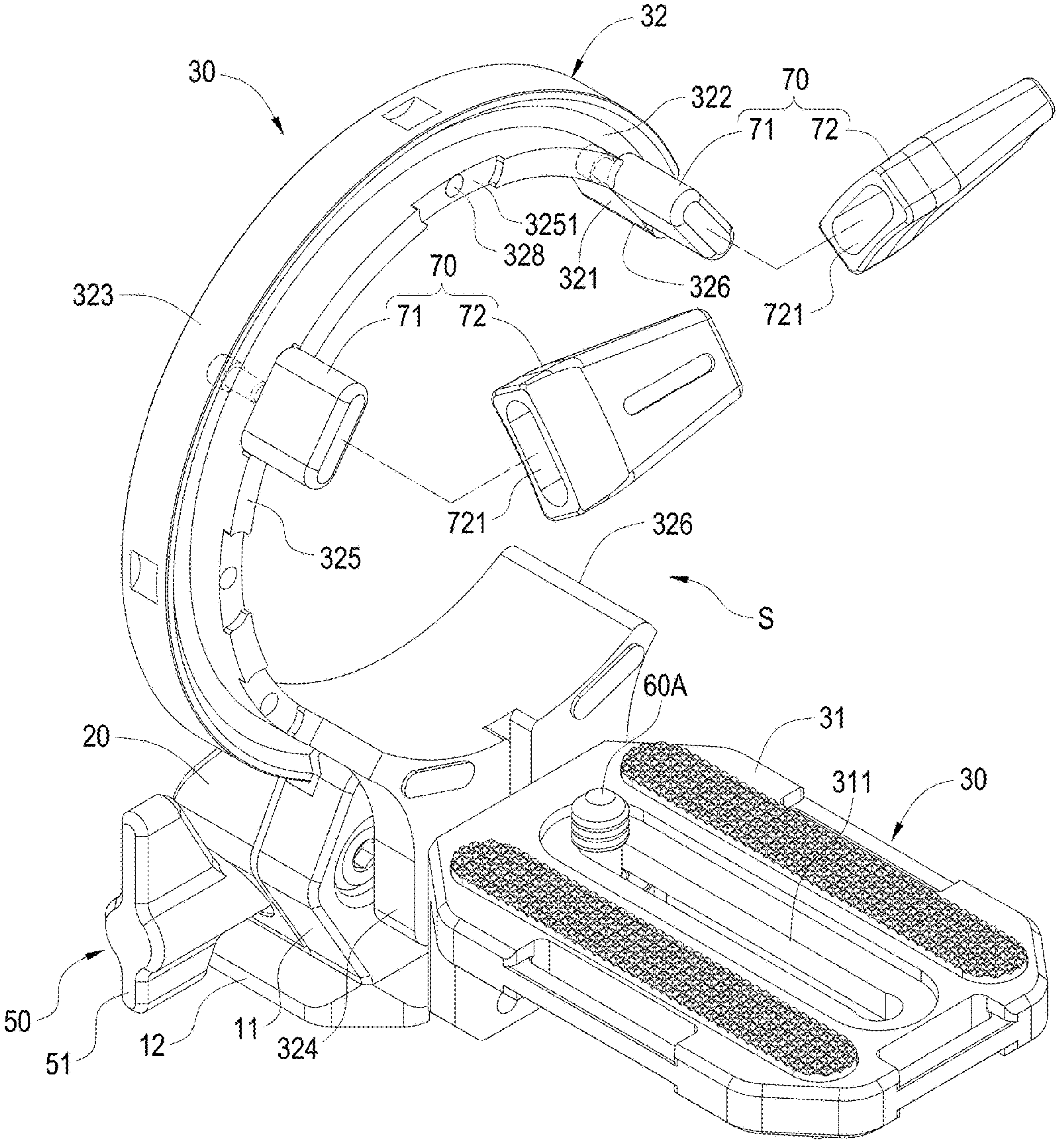
FIG. 11 is a disassembled view of the gimbal structure of the second embodiment of the present disclosure.
Figure 12:
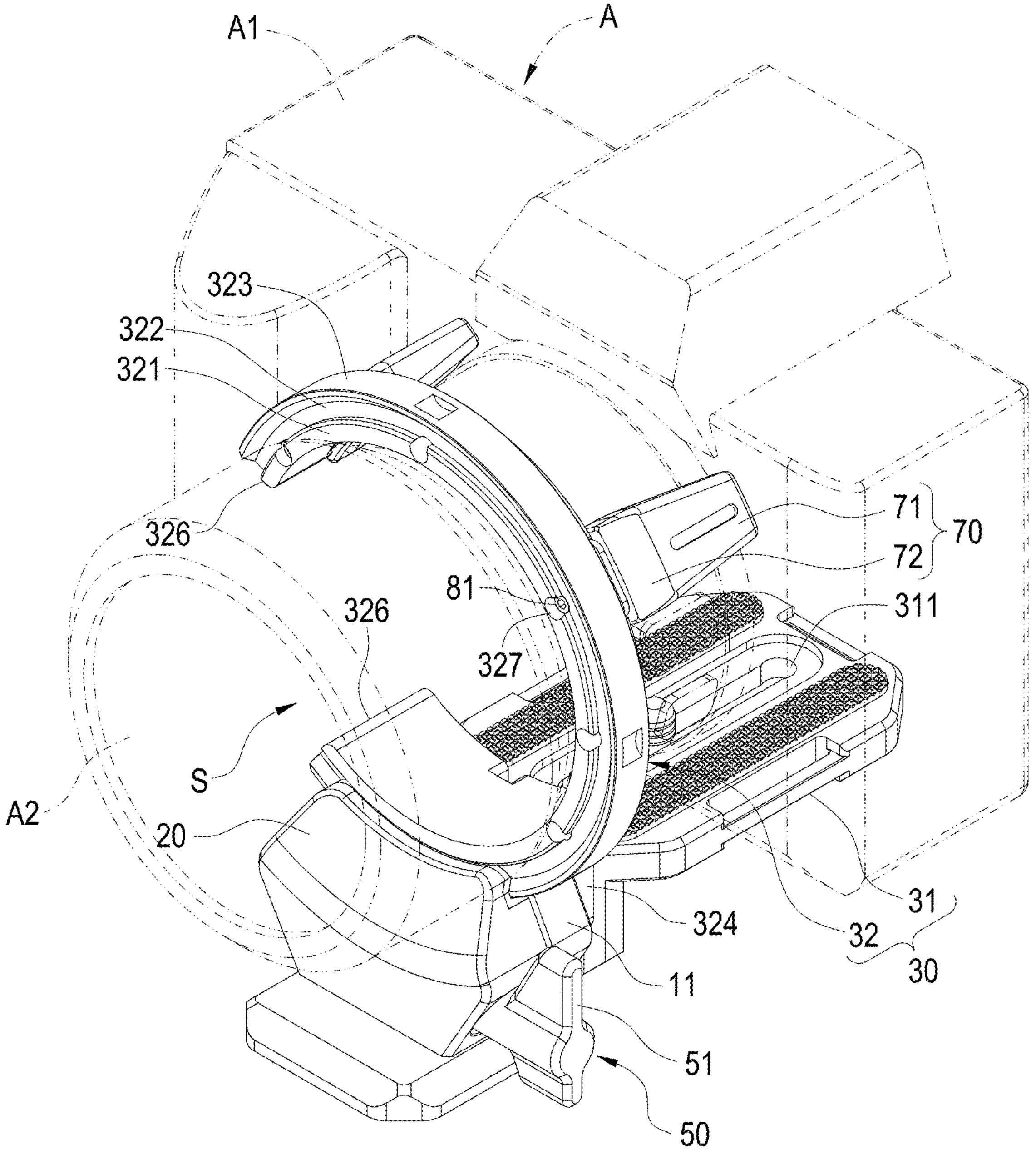
FIG. 12 is a perspective view of the gimbal structure of the second embodiment of the present disclosure.

With reference to FIGS. 11 and 12 for the gimbal structure in accordance with the second embodiment of the present disclosure, this embodiment is substantially the same as the embodiments as shown in FIGS. 1 to 10, except that the detachable retaining frame 70 of this embodiment further includes an extension block 72 sheathing the main body block 71.

Further, in this embodiment, there are a multiple of detachable retaining frames 70, but the present disclosure is not limited to such arrangement, and the quantity of detachable retaining frames 70 may be one, an end of each extension block 72 is provided with an embedded notch 721 and another end of each extension block 72 is provided for abutting and blocking the camera body A1, each main body block 71 is tightly embedded into each embedded notch 721, so that each extension block 72 is sheathed on each main body block 71 to extend the overall length of the detachable retaining frame 70.

Since some of the lenses A2 have shortcut keys, when the overall length of the detachable retaining frame 70 is too short, it may cause the arc slide rail 32 and the camera body A1 to be too near to each other and cover the shortcut keys on the lens A2, therefore the detachable retaining frame 70 of this embodiment adds the extension block 72 sheathing the main body block 71 to increase the overall length to achieve the effects and advantages of preventing the covering of the shortcut keys on the lens A2 and operating the lens conveniently.

Figure 13:
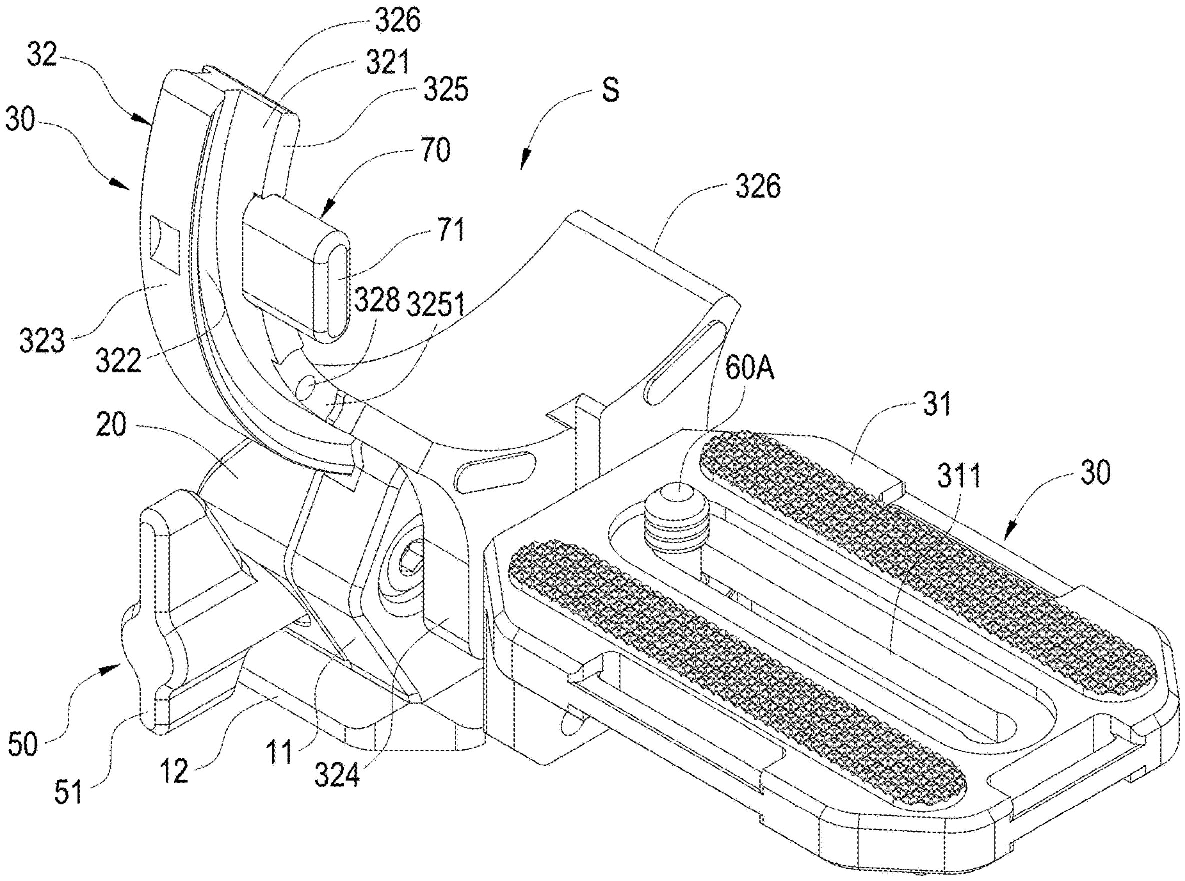
FIG. 13 is a perspective view of the gimbal structure of the third embodiment of the present disclosure.

With reference to FIG. 13 for the gimbal structure in accordance with the third embodiment of the present disclosure, this embodiment is substantially the same as the embodiments as shown in FIGS. 1 to 10, except that the spacing S at two ends of the arc slide rail 32 of this embodiment is in a semi-arc shape.

When the spacing S of the arc slide rail 32 is smaller than the diameter of the lens A2, the user must remove the camera body A1 from the mounting platform 31 first, and then change the lens A2 by separating the lens A2 from the arc slide rail 32 along the axial direction of the lens arc slide rail 32; on the other hand, the arc slide rail 32 of this embodiment is in the semi-arc shape, so that the spacing S of the arc slide rail 32 is greater than the diameter of the lens A2, and lens A2 is separated from the arc slide rail 32 through the space of the spacing S to change the lens A2, and make the gimbal structure of the present disclosure have the feature of changing the lens A2 conveniently.

With reference to FIGS. 14 to 18 for the gimbal structure in accordance with the fourth embodiment of the present disclosure, this embodiment is substantially the same as the embodiments as shown in FIGS. to 10, except that the structure of the adjustment component 50 of the gimbal structure of the present disclosure is different.

In this embodiment, the adjustment component 50 includes a lever handle 54 and a positioning pin 53. The lever handle 54 has a cylindrical rotating part 541. The rotating part 541 has a gap 541A and a through hole 541B communicating to each other. In this embodiment, the through hole 541B penetrates two end surfaces of the rotating part 541 and is configured eccentrically with the rotating part 541, that is, the center of the through hole 541B and the center of the rotating part 541 are located at different positions, the gap 541A extends inward from a side edge of the rotating part 541 and communicates to the through hole 541B. The positioning pin 53 is snapped in the through hole 541B, and a side edge of the positioning pin 53 is provided with a screw hole 531 corresponding to the gap 541A. In this way, when the lever handle 54 is turned to drive the rotating part 541 to rotate, so as to drive the positioning pin 53 inside the rotating part 541 to rotate altogether.

In this embodiment, the first clamping plate 11 has a first through slot 113, the second clamping plate 20 has a compartment 23 and a second through slot 24 communicating to each other. In this embodiment, the first through slot 113 is a strip slot longitudinally penetrating through the first clamping plate 11 end extending horizontally, and the compartment 23 extends inward from the front side of the second clamping plate 20, and the second through slot 24 is also a strip slot extending inward from the rear side of the second clamping plate 20, communicating to the compartment 23, and corresponding to the first through slot 113. The rotating part 541 is rotatably accommodated in the compartment 23, and the lever handle 54 is exposed to the outside of the second clamping plate 20. In this embodiment, the pressing part 40 is a shoulder bolt. The pressing part 40 includes a first through slot 113, a second through slot 24 and a gap 541A sequentially passing through the rear side of the first clamping plate 11, and screwing and fixing to the screw hole 531 of the positioning pin 53.

Figure 14:
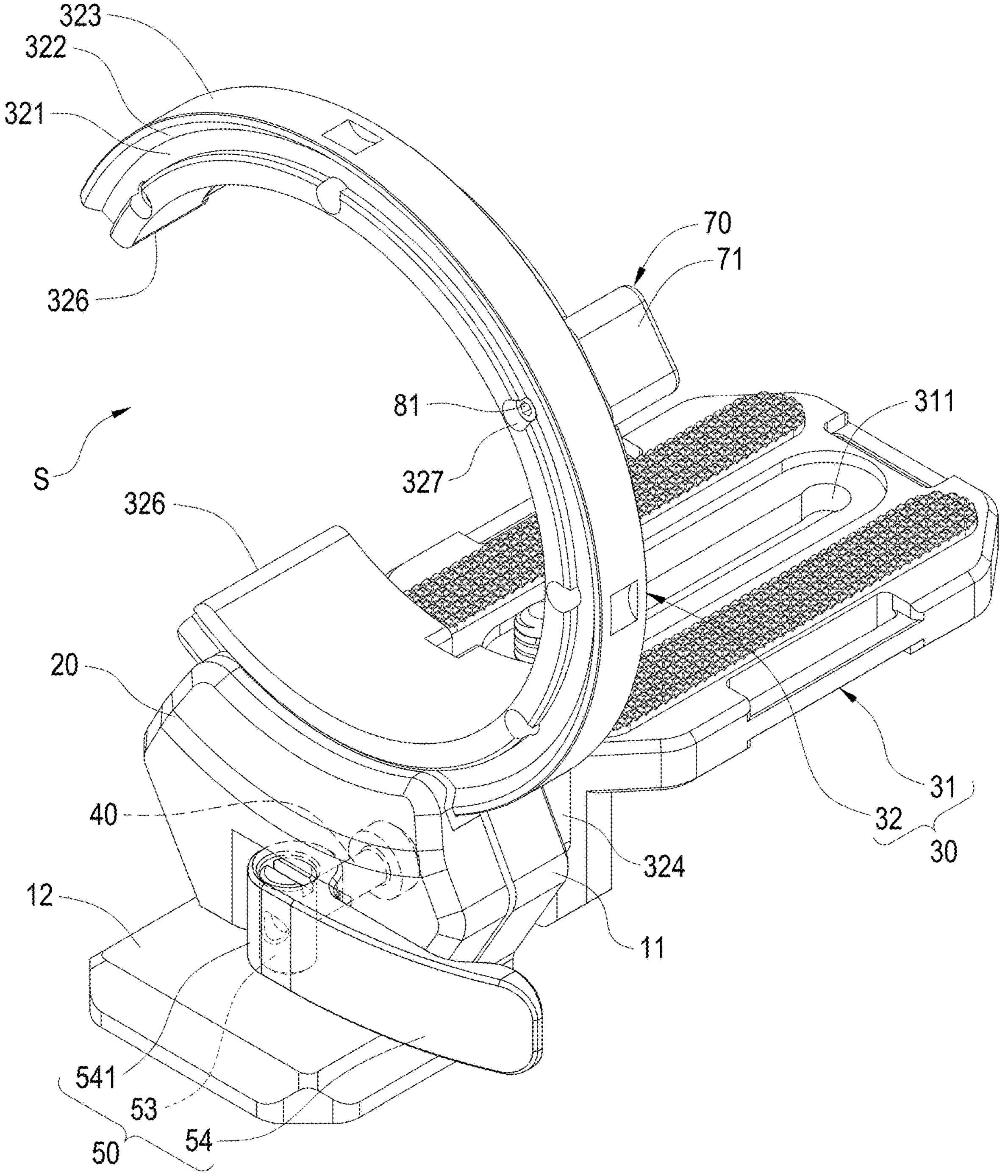
FIG. 14 is a perspective view of the gimbal structure of the fourth embodiment of the present disclosure.
Figure 15:
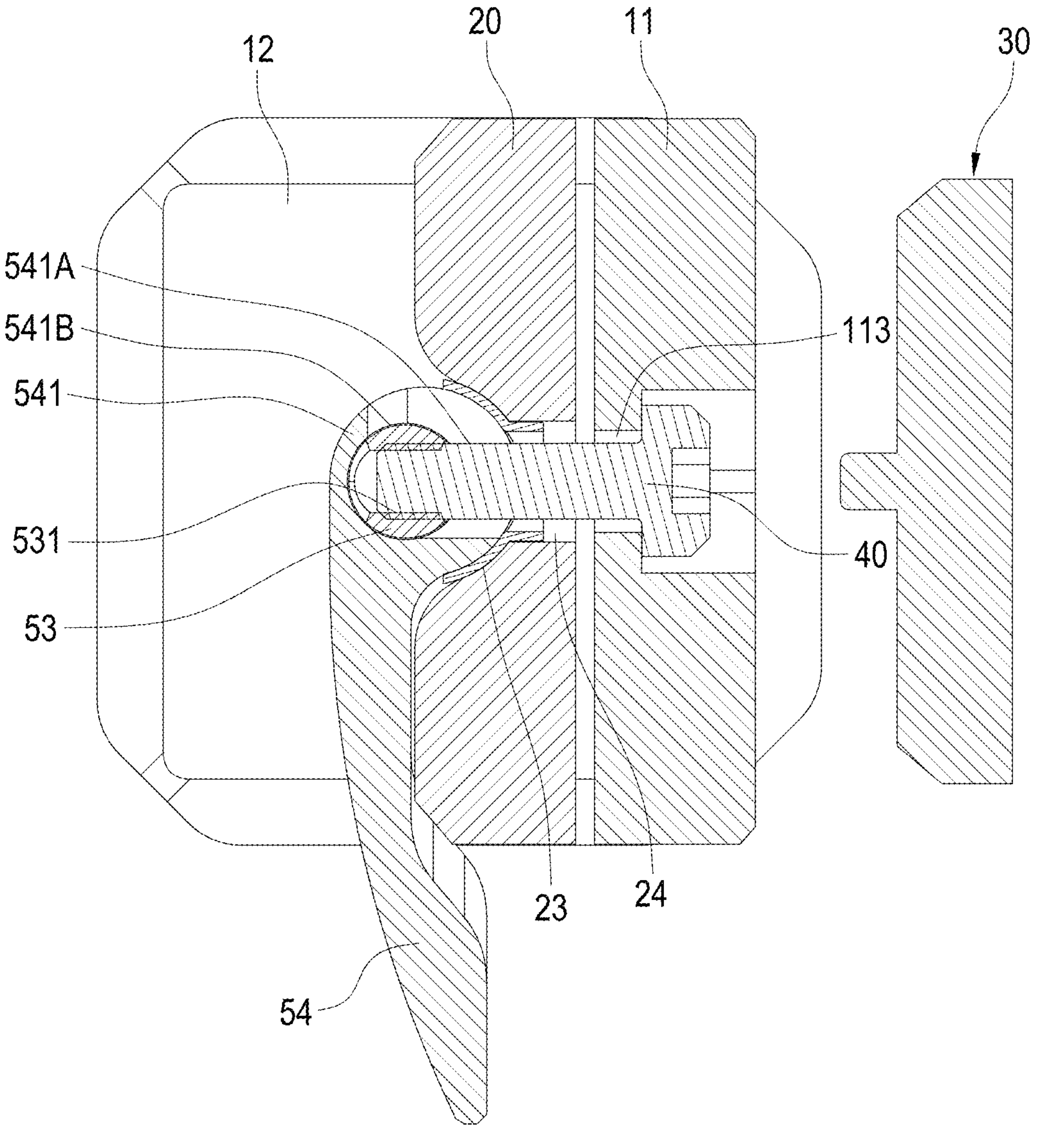
FIG. 15 is a cross-sectional view showing the using status of the gimbal structure of the fourth embodiment of the present disclosure.
Figure 16:
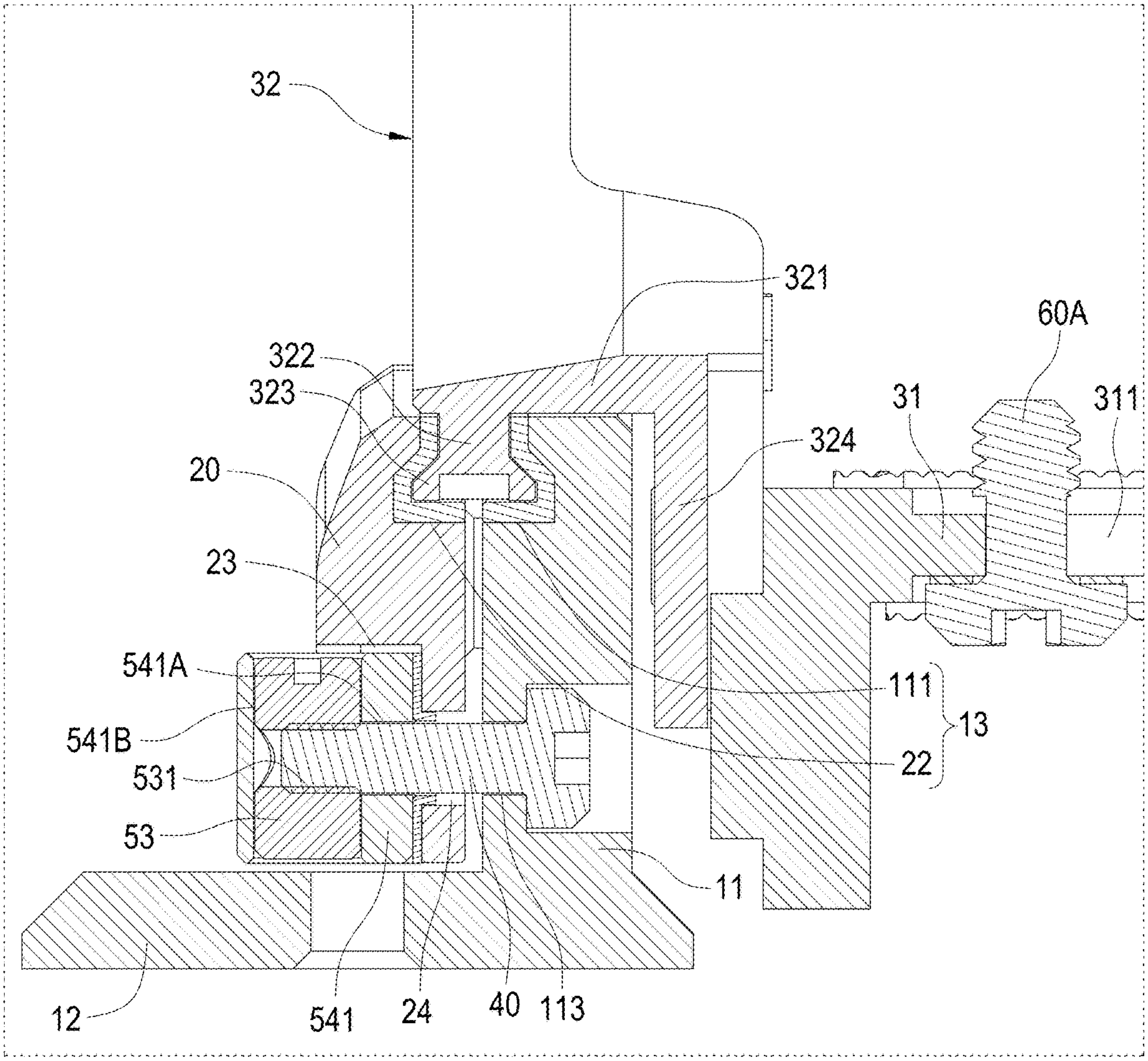
FIG. 16 is another cross-sectional view showing the using status of the gimbal structure of the fourth embodiment of the present disclosure.
Figure 17:
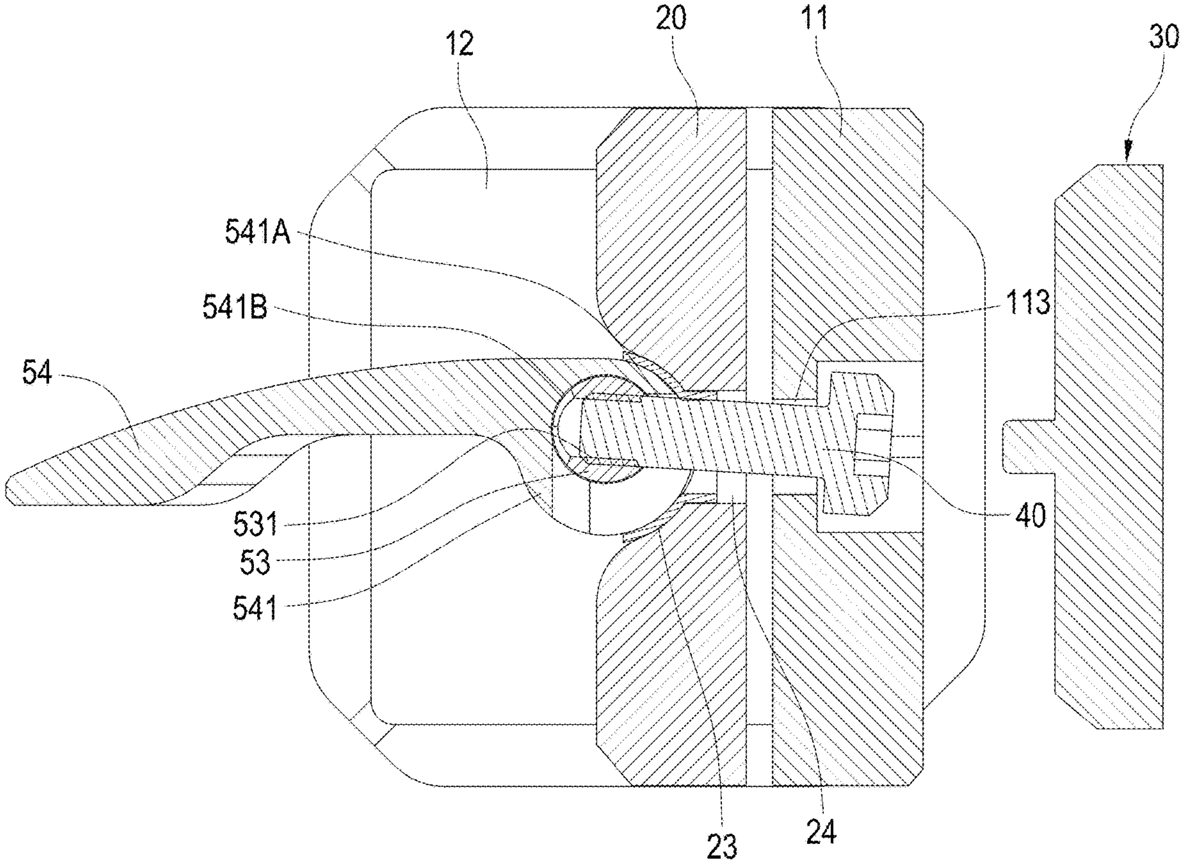
FIG. 17 is a further cross-sectional view showing the using status of the gimbal structure of the fourth embodiment of the present disclosure.
Figure 18:
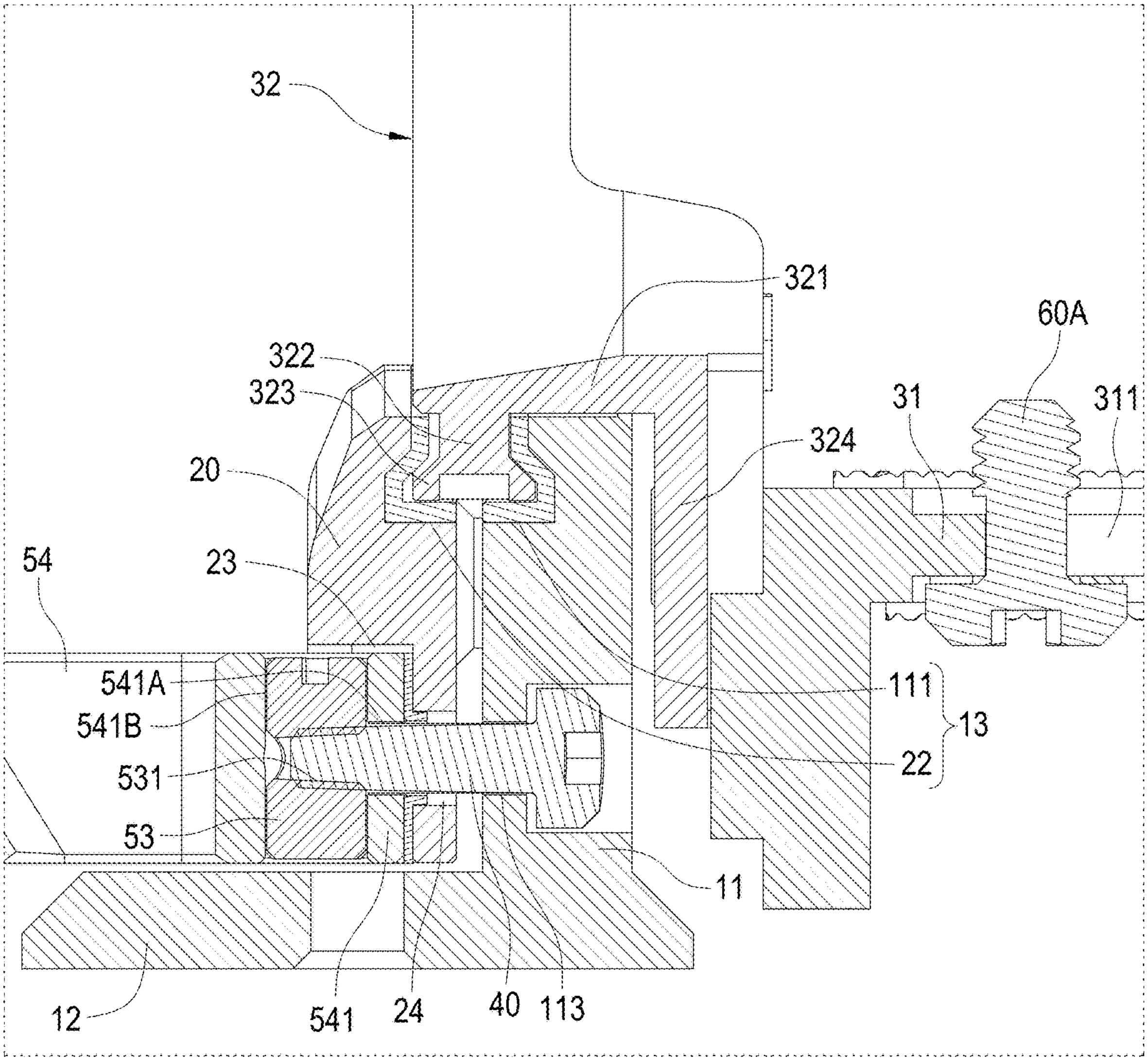
FIG. 18 is another further cross-sectional view showing the using status of the gimbal structure of the fourth embodiment of the present disclosure.

In FIGS. 14 to 16, when the adjustment component 50 is situated at the locked position, the lever handle 54 is flatly attached to the front side of the first clamping plate 11, the positioning pin 53, the first through slot 113 and the second through slot 24 are located on the same horizontal line, so that the pressing part 40 is in a horizontal status, and the second clamping plate 20 is pressed towards the first clamping plate 11 to clamp and fix the arc slide rail 32 between the first arc clamping groove 111 and the second arc clamping groove 22 In FIGS. 17 and 18, when the lever handle 54 is turned 90 degrees towards the front to set the adjustment component 50 to the unlocked position, since the positioning pin 53 and the rotating part 541 are configured eccentrically, therefore the positioning pin 53 is driven by the rotating part 541 to deflect transversally towards the first through slot 113 and the second through slot 24, and to make the pressing part 40 to rotate with the positioning pin 53 and deflect transversally along the strip groove of the first through slot 113 and the strip groove of the second through slot 24, so as to release the pressing against second clamping plate 20 and the first clamping plate 11 and to allow the arc slide rail 32 to slide in the gap between the first arc clamping groove 111 and the second arc clamping groove 22, in order to adjust the angle of the rotating base 30.

With reference to FIGS. 19 to 22 for the gimbal structure in accordance with the fifth embodiment of the present disclosure, this embodiment is substantially the same as the embodiments as shown in FIGS. to 10, except that the structure of the adjustment component 50 of this embodiment is different.

In this embodiment, the adjustment component 50 includes a knob 55, a fixing part 56, a baffle plate 57 and a compression spring 58. The knob 55 has a handle 551 and a cylindrical rotating part 552. Two end surfaces of the rotating part 552 are respectively provided with a blind hole 552A and a groove 552B configured relative to each other and communicating to each other. In this embodiment, the blind hole 552A extends inward from the rear-end surface of the rotating part 552, the groove 552B extends inward from the front-end surface of the rotating part 552, and the blind hole 552A and groove 552B communicate to each other through a penetrating hole 552C formed between the blind hole 552A and the groove 552B. The handle 551 is arranged on the front-end surface of the rotating part 552 to cover the groove 552B.

Figure 19:
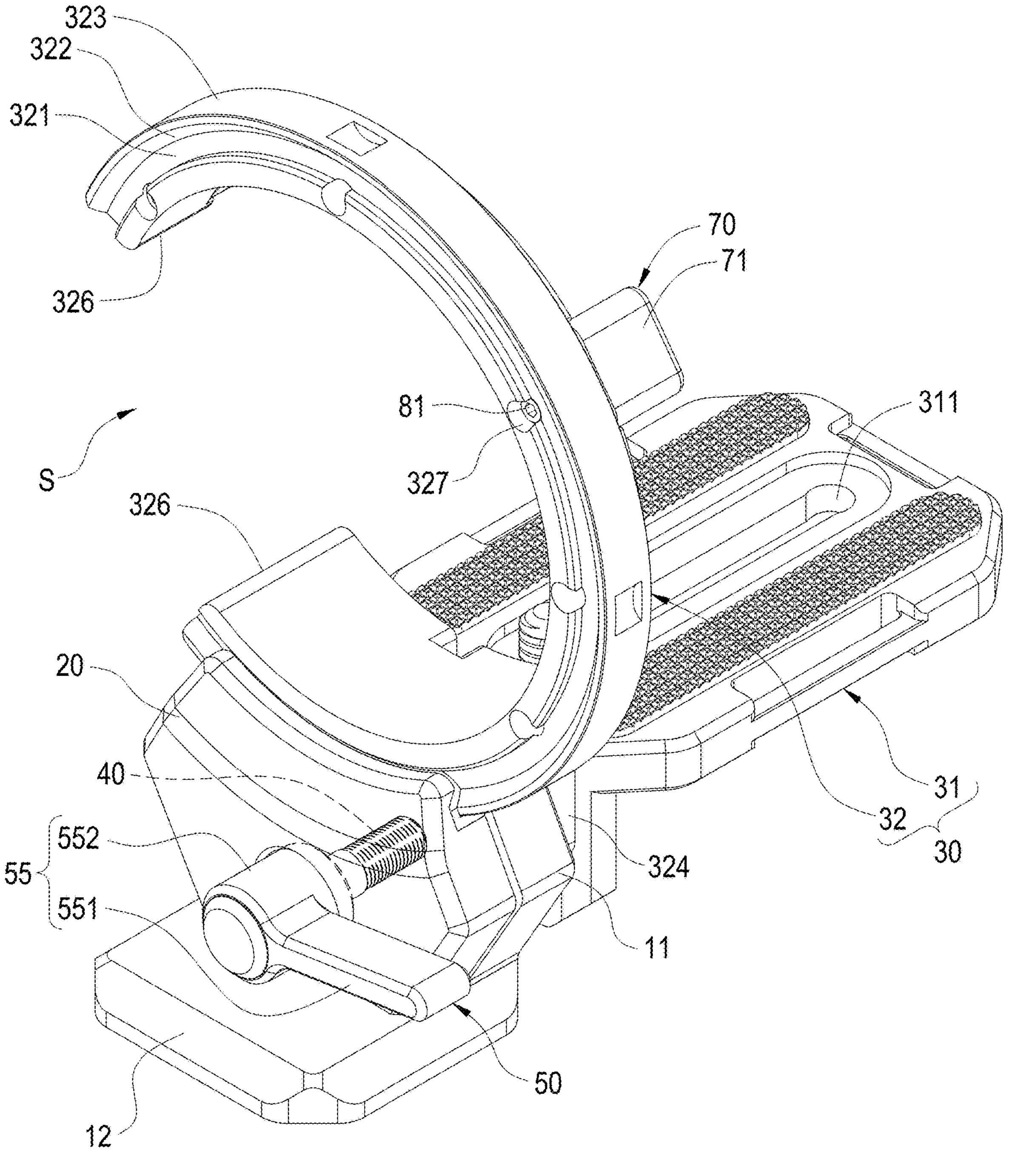
FIG. 19 is a perspective view of the gimbal structure of the fifth embodiment of the present disclosure.
Figure 21:
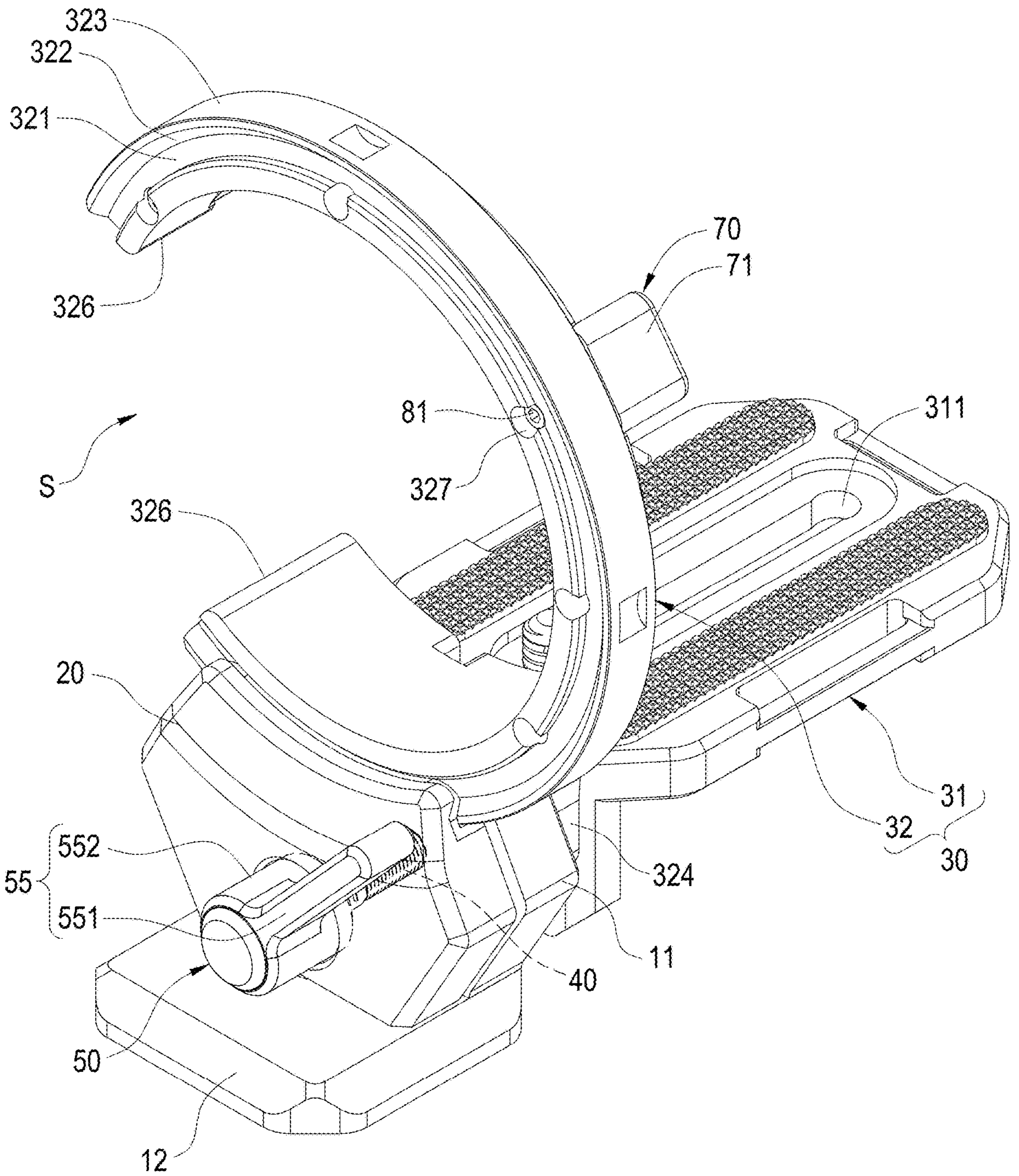
FIG. 21 is a perspective view showing the using status of the gimbal structure of the fifth embodiment of the present disclosure.

In this embodiment, the first clamping plate 11 has a locking hole 114, and the second clamping plate 20 has a compartment 23 and a second through slot 24 communicating to each other. In this embodiment, the locking hole 114 is a threaded hole longitudinally penetrating through the first clamping plate 11, the compartment 23 extends inward from the front side of the second clamping plate 20, the second through slot 24 extends inward from the rear side of the second clamping plate 20 and communicates to the compartment 23. The second through slot 24 is a round hole with the position and size corresponding to the position and size of the locking hole 114, and the diameter of the second through slot 24 is smaller than the diameter of the compartment 23 as shown in FIGS. 19 and 21. The rotating part 552 is partially and rotatably installed in the compartment 23, and the knob 55 is exposed to the outside of the second clamping plate 20.

In this embodiment, the pressing part 40 is in the shape of a rod and includes a socket section 41, an abutment section 42 and a threaded section 43 sequentially communicating to each other, and the diameter of the abutment section 42 is greater than the socket section 41 or the threaded section 43. Two end surfaces of the abutment section 42 abut the bottom of the blind hole 552A and the bottom of the compartment 23 to pass and snap the socket section 41 into the penetrating hole 552C and to be accommodated in the groove 552B. In this way, when the knob 55 is turned, the handle 551 drives the rotating part 552 to rotate, so as to drive the pressing part 40 snapped in the rotating part 552 to rotate altogether. The fixing part 56 is provided for fixing the baffle plate 57 to the socket section 41. The compression spring 58 sheathes the outer edge of the socket section 41 and elastically abutted with a preload between the bottom of the groove 552B and the baffle plate 57.

In this embodiment, the fixing part 56 is a screw, the baffle plate 57 is a gasket, and the socket section 41 is a stud. The screw passes through the gasket and then is locked into the stud, but the present disclosure is not limited to such arrangement. For example, the fixing part 56 is a rivet, and the socket section 41 is a hollow cylinder. Therefore, the socket section 41, the fixing part 56, the baffle plate 57 and the compression spring 58 are accommodated in the groove 552B of the rotating part 552. The threaded section 43 passes through the second through slot 24 and is screwed to the locking hole 114. It is noteworthy that the threaded section 43 has an external thread only in the part screwed to the locking hole 114, but not in the part passing through the second through slot 24.

Figure 20:
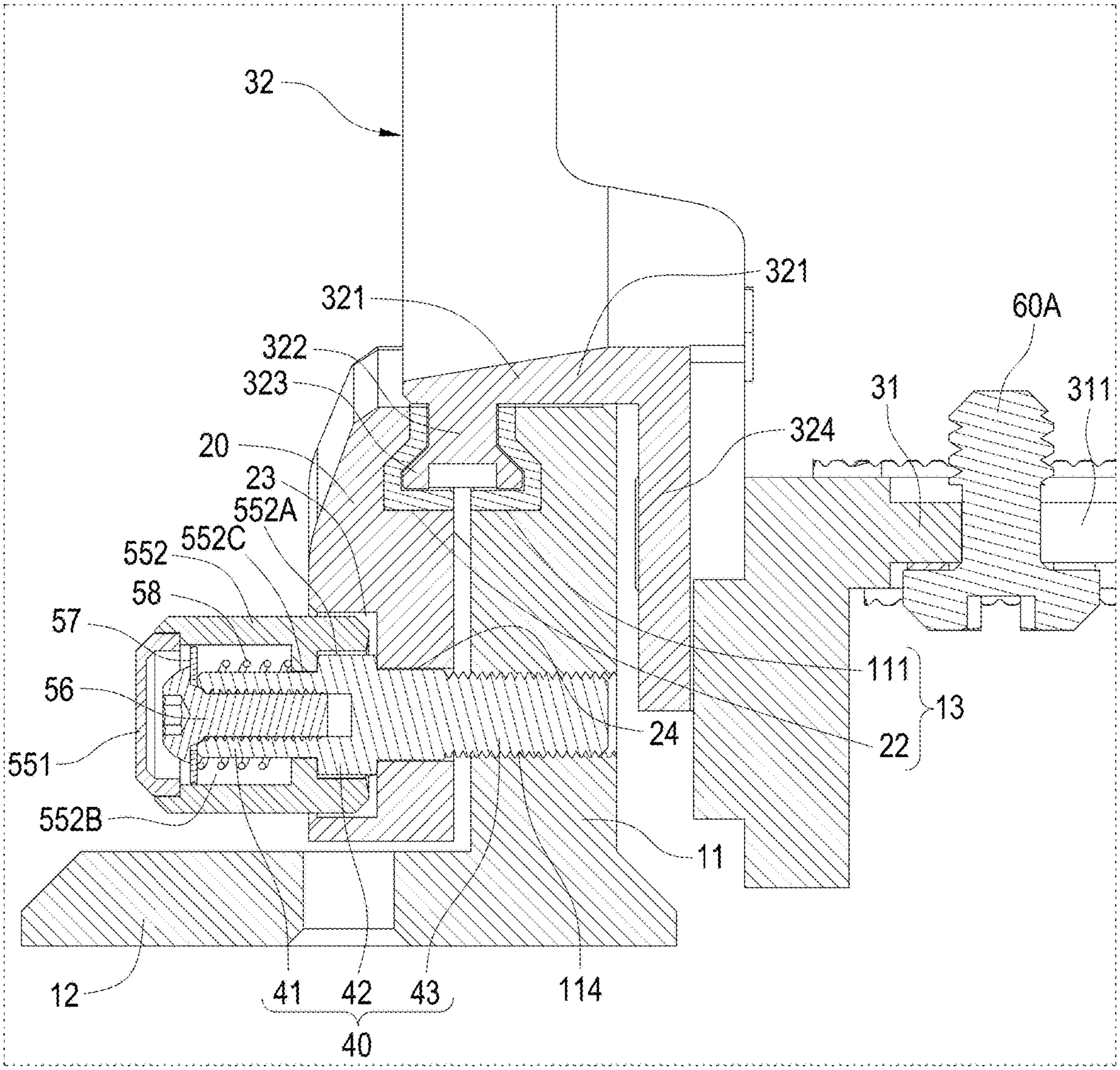
FIG. 20 is cross-sectional view of the gimbal structure of the fifth embodiment of the present disclosure.
Figure 22:
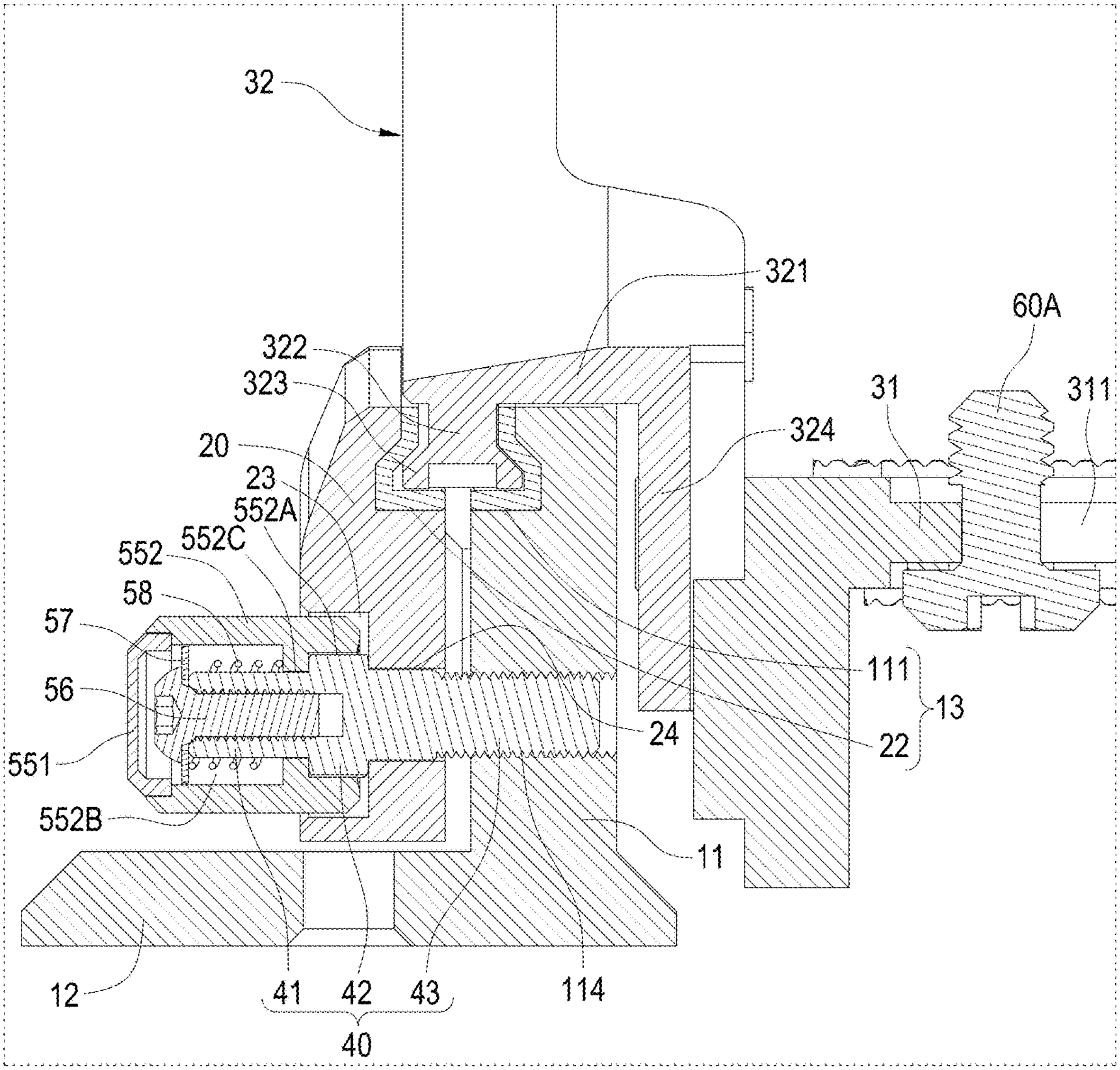
FIG. 22 is a cross-sectional view showing the using status of the gimbal structure of the fifth embodiment of the present disclosure.

In FIGS. 19 and 20, when the adjustment component 50 is situated at the locked position, the abutment section 42 abuts the bottom of the compartment 23, so that the threaded section 43 of the pressing part 40 tightly presses the second clamping plate 20 towards the first clamping plate 11 through the locking hole 114, so as to clamp and fix the arc slide rail 32 between the first arc clamping groove 111 and the second arc clamping groove 22. In FIGS. 21 and 22, when the knob 55 is turned 45 degrees clockwise to set the adjustment component 50 to the unlocked position, the pressing part 40 is driven by the rotating part 552 to rotate forward altogether, so that a part of the threaded section 43 is detached from the screw connection with the locking hole 114 to release the pressing against the second clamping plate 20 and the first clamping plate 11 and to allow the arc slide rail 32 to slide in the gap between the first arc clamping groove 111 and the second arc clamping groove 22 in order to adjust the angle of the rotating base 30.

It is noteworthy that the compression spring 58 elastically abuts the baffle plate 57 with a preload, so that regardless of the adjustment component 50 being in the unlocked position or locked position, the pressing part 40 will be driven by the forward pulling force to prevent the outer thread of the threaded section 43 from being loosened from the locking hole 114, so as to effectively ensure the stability and reliability of the pressing part 40 and preventing the rotating base 30 from sliding due to gravity.

With reference to FIGS. 23 to 26 for the gimbal structure in accordance with the sixth embodiment of the present disclosure, this embodiment is substantially the same as the embodiments as shown in FIGS. to 10, except that the structure of the adjustment component 50 of this embodiment is different.

In this embodiment, the fixing bracket 10 includes a first clamping plate 11, a second clamping plate 20 and an arc rail component 14 clamped between the first clamping plate 11 and the second clamping plate 20. The arc rail slot 13 is formed on the inner side of the arc rail component 14. In this embodiment, the arc rail component 14 is formed by two L-shaped rails arranged opposite to each other and having an L-shaped cross-section, but the present disclosure is not limited to such arrangement, and the arc rail component 14 may also be formed by a U-shaped rail with a U-shaped cross-section.

In addition, at least one of the first clamping plate 11 and the second clamping plate 20 has a recessed groove 15 corresponding to the arc rail component 14, that is, the recessed groove 15 is formed on the first clamping plate 11 or the second clamping plate 20, or a part of the recessed groove 15 is formed on the first clamping plate 11 and another part of the recessed groove 15 is formed on the second clamping plate 20.

In this embodiment, the adjustment component 50 includes a knob 51', a hollow stud 9 and a push block 59, the hollow stud 9 is fixed to an end of the recessed groove 15, the push block 59 is accommodated in the recessed groove 15, the push block 59 is provided with a hollow hole 591 and an abutting slope 592 with the arc rail component 14 extending from the abutting slope 592 and abutting the arc slide rail 32 and gradually increasing in thickness in the direction away from the hollow stud 9, an end of the knob 51' passes through the hollow hole 591 and is screwed and fixed to the hollow stud 9, and another end of the knob 51' is exposed to the outside of the first clamping plate 11.

Figure 23:
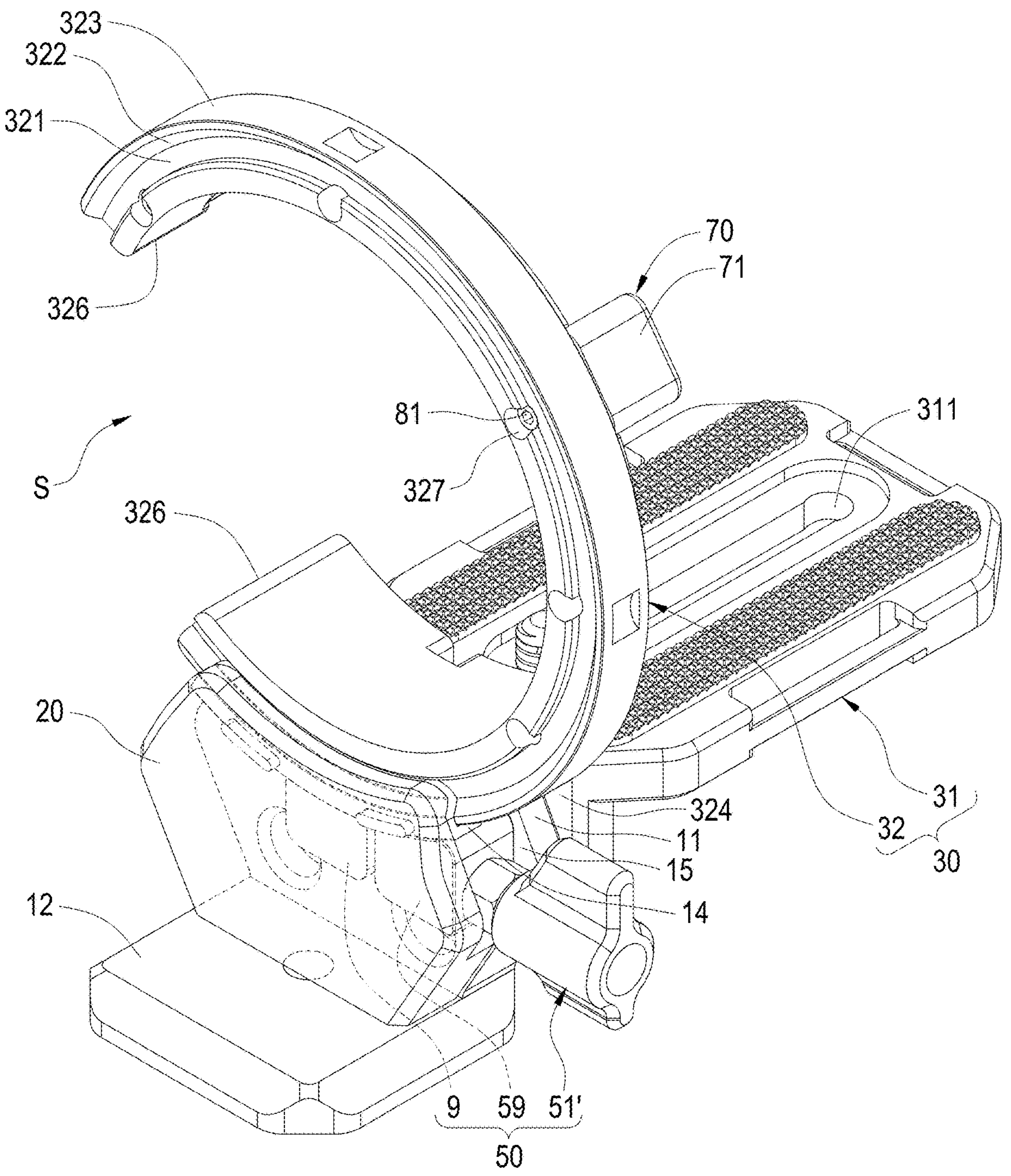
FIG. 23 is a perspective view of the gimbal structure of the sixth embodiment of the present disclosure.
Figure 24:
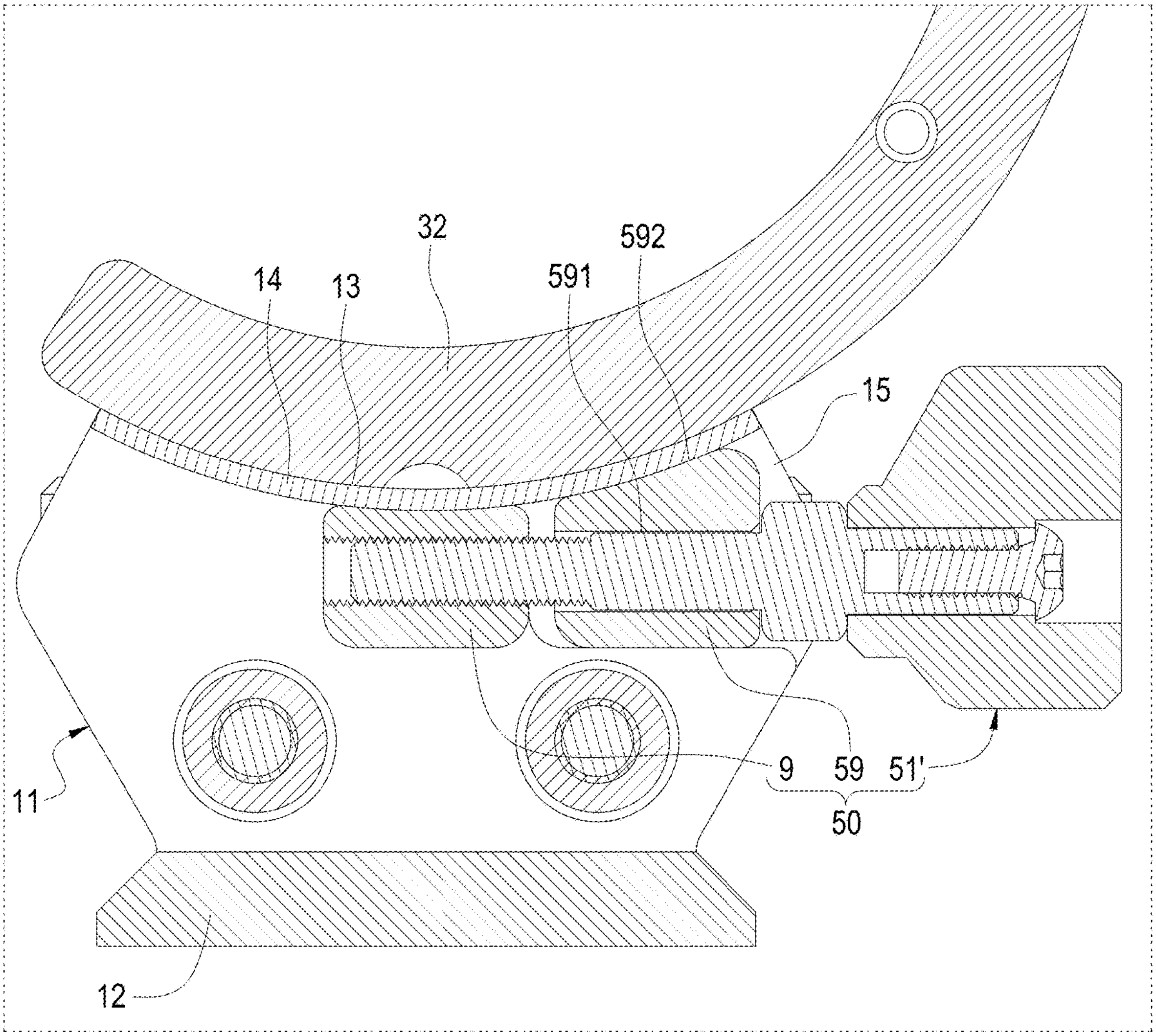
FIG. 24 is a cross-sectional view of the gimbal structure of the sixth embodiment of the present disclosure.
Figure 25:
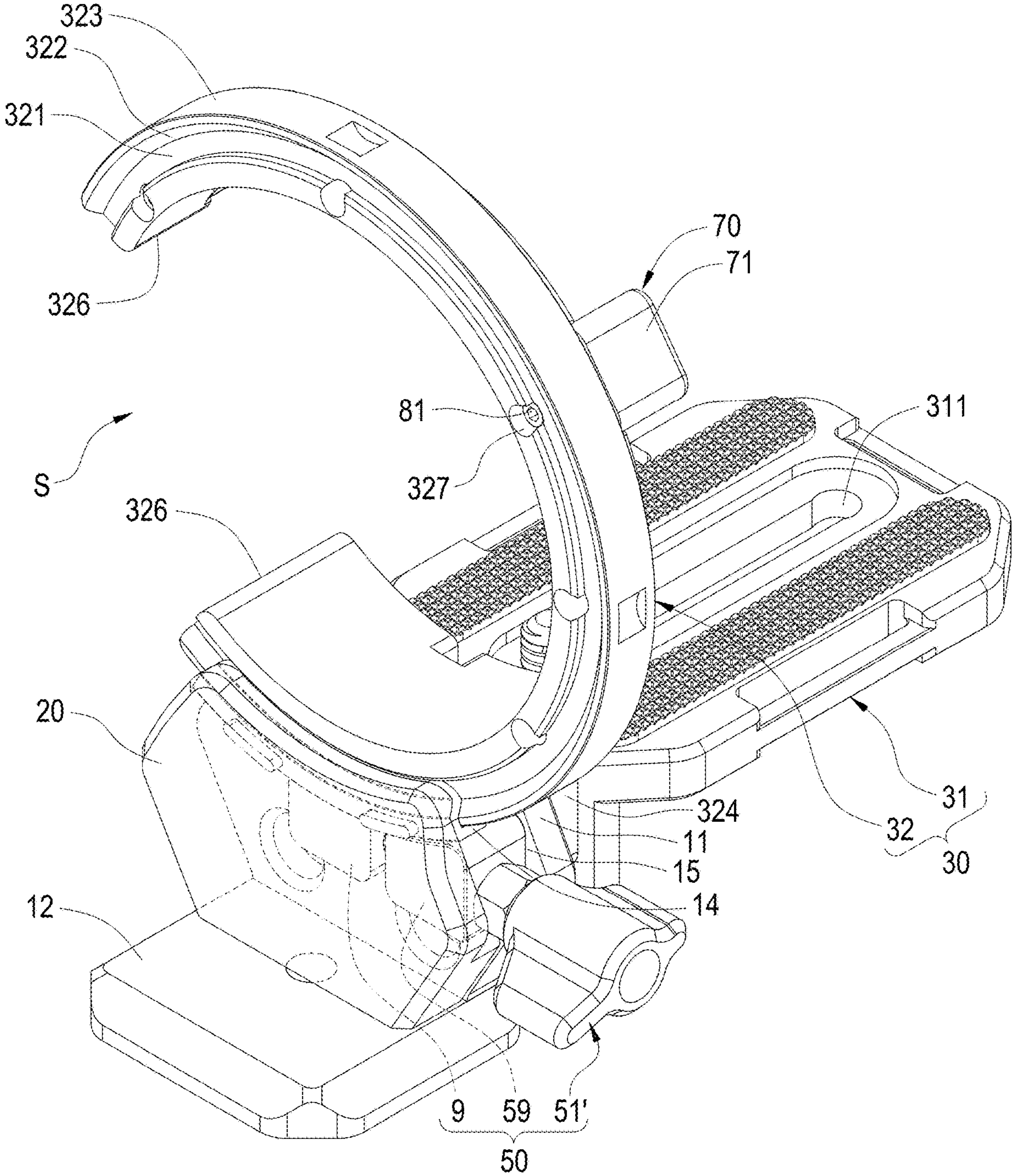
FIG. 25 is a perspective view showing the using status of the gimbal structure of the sixth embodiment of the present disclosure.
Figure 26:
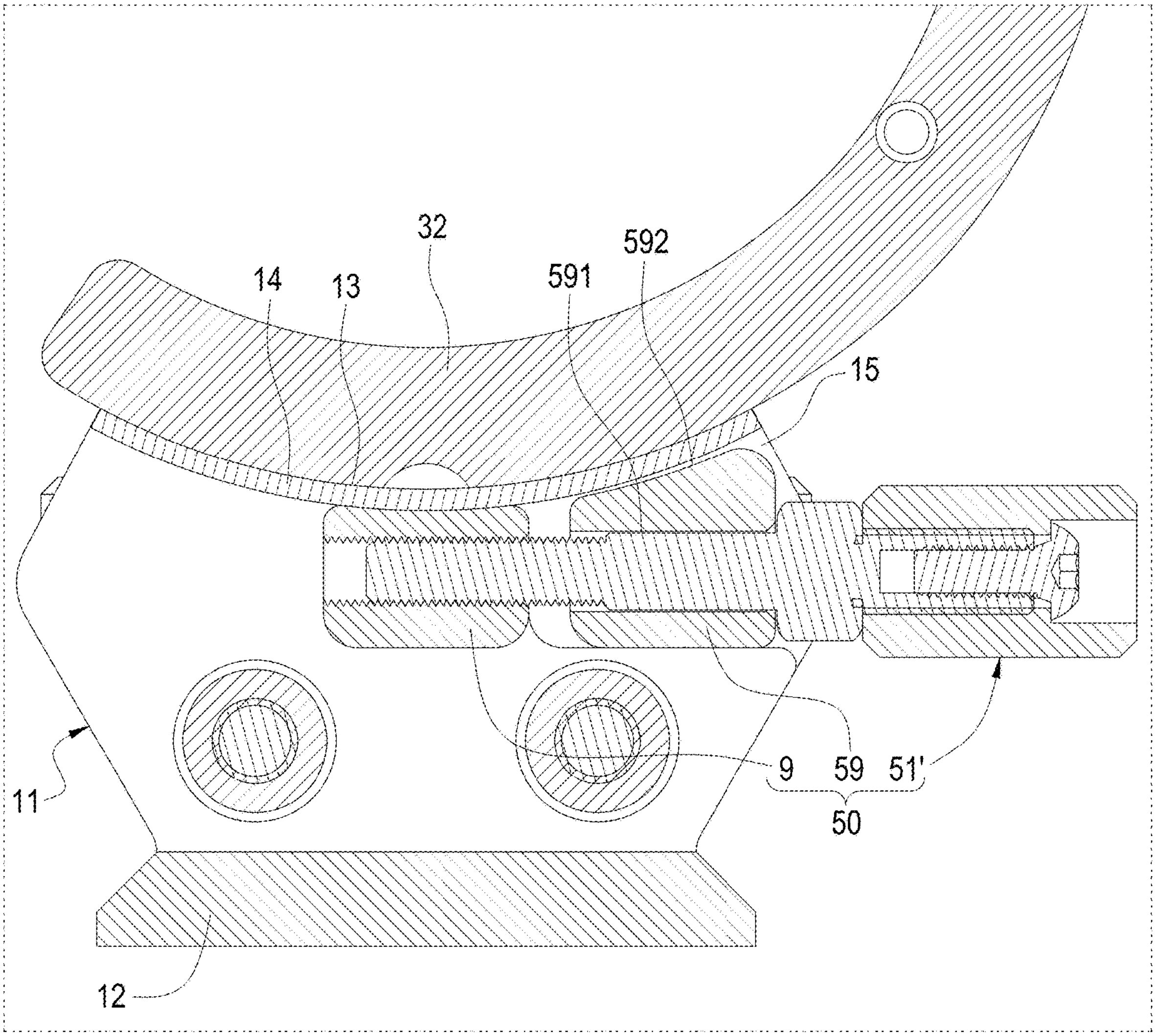
FIG. 26 is a cross-sectional view showing the using status of the gimbal structure of the sixth embodiment of the present disclosure.

Thus, as shown in FIGS. 23 and 24, when the knob 51' is tightly screwed to the hollow stud 9, the knob 51' will push the push block 59 to move in the direction approaching the hollow stud 9, so that the abutting slope 592 pushes against the arc rail component 14, which in turn drives the arc rail component 14 to press against the arc slide rail 32 in order to fix the position and angle of the rotating base 30. Conversely, as shown in FIGS. 25 and 26, when the knob 51' is loosened from the hollow stud 9, the knob 51' moves in the direction away from the hollow stud 9 to loosen the push block 59, such that the abutting slope 592 also loosens the arc rail component 14, the arc slide rail 32 lets the arc rail component 14 have a gap to slide, and the arc slide rail 32 is slidable in the gap to adjust the angle of the rotating base 30.

While this disclosure has been described by means of specific embodiments, numerous modifications and variations may be made thereto by those skilled in the art without departing from the scope and spirit of this disclosure set forth in the claims.

What is claimed is:

1. A gimbal structure with a detachable retaining frame, for carrying a photography device, the photography device comprising a camera body and a lens, the gimbal structure comprising:

a fixing bracket, comprising an arc rail slot;

a rotating base, comprising a mounting platform and an arc slide rail coupled to the mounting platform, wherein the mounting platform is provided for mounting the photography device, a part of the arc slide rail rotatably slides in the arc rail slot and drives the mounting platform to rotate altogether, the arc slide rail is arranged outside the lens and comprises a mounting surface arranged relative to the camera body, and the arc slide rail comprises two ends and a spacing defined between the two ends; and at least one detachable retaining frame, one end thereof detachably coupled to the mounting surface and another end thereof provided for blocking the camera body, wherein the mounting surface comprises a plurality of positioning notches, the detachable retaining frame comprises a main body block detachably coupled to the mounting surface, and the main body block is selectively embedded in one of the positioning notches.

2. The gimbal structure according to claim 1, wherein the detachable retaining frame further comprises an extension block adapted to sheathe the main body block, an embedded notch is defined on one end of the extension block, another end of the extension block is provided for blocking the camera body, and the main body block is embedded in the embedded notch.

3. The gimbal structure according to claim 1, further comprising at least one screw, the arc slide rail comprising a plurality of countersinks and a plurality of first locking holes communicating with one another and defined from a bottom wall of each of the positioning notches, the main body block comprising a second locking hole, the screw comprising a head and a shaft, the head embedded in one of the countersinks, and the shaft passing through and fixed to one of the first locking holes and the second locking hole.

4. The gimbal structure according to claim 1, wherein the fixing bracket comprises a first clamping plate and a second clamping plate, the first clamping plate comprises a first arc clamping groove, the second clamping plate is positioned corresponding to the first clamping plate, the second clamping plate comprises a second arc clamping groove, and the arc rail slot is collectively defined by the first arc clamping groove and the second arc clamping groove.

5. The gimbal structure according to claim 4, wherein the arc slide rail comprises a body part, a connection part and a limiting part, the connection part perpendicularly extends from an outer edge of the body part and is coupled with the limiting part, the limiting part gradually expands outward from the connection part, shapes of the first arc clamping groove and the second arc clamping groove are arranged corresponding to shapes of the connection part and the limiting part.

6. The gimbal structure according to claim 4, further comprising a pressing part and an adjustment component, the pressing part passes through and is coupled to the first clamping plate and the second clamping plate, the adjustment component is installed on the second clamping plate and coupled to the pressing part, the adjustment component is switchable between an unlocked position and a locked position, when the adjustment component is situated at the unlocked position, the arc slide rail is slidable in the arc rail slot to adjust an angle of the rotating base, and when the adjustment component is situated at the locked position, the pressing part presses the first clamping plate and the second clamping plate to clamp and fix the arc slide rail in the arc rail slot.

7. The gimbal structure according to claim 6, wherein the adjustment component comprises a knob, a socket and a positioning pin, the knob is coupled to the socket, the socket comprises a gap and a blind hole communicating to each other, the positioning pin is disposed in the blind hole and comprises a screw hole corresponding to the gap, the first clamping plate comprises a first through slot, the second clamping plate comprises compartment and a second through slot communicating to each other, the socket is rotatably inserted in the compartment and the knob is exposed from the second clamping plate, the pressing part passes through the first through slot, the second through slot and the gap sequentially and is screwed and fixed to the screw hole, the positioning pin and the socket are eccentrically arranged, and the pressing part is a shoulder bolt.

8. The gimbal structure according to claim 6, wherein the adjustment component comprises a lever handle and a positioning pin, the lever handle comprises a rotating part, the rotating part comprises a gap and a through hole communicating to each other, the positioning pin is disposed in the through hole and comprises a screw hole corresponding to the gap, the first clamping plate comprises a first through slot, the second clamping plate comprises a compartment and a second through slot communicating to each other, the rotating part is rotatably accommodated in the compartment, the pressing part passes through the first through slot, the second through slot and the gap sequentially and is screwed and fixed to the screw hole, the positioning pin and the rotating part are arranged eccentrically, and the pressing part is a shoulder bolt.

9. The gimbal structure according to claim 6, wherein the adjustment component comprises a knob, a fixing part, a baffle plate and a compression spring, the knob comprises a rotating part, the rotating part comprises a blind hole and a groove defined on two ends thereof and communicating to each other, the first clamping plate comprises a locking hole, the second clamping plate comprises a compartment and a second through slot communicating to each other, the rotating part is rotatably installed in the compartment, the pressing part comprises a socket section, an abutment section and a threaded section sequentially connected to each other, the abutment section abuts a bottom of the blind hole and a bottom of the compartment to make the socket section be accommodated in the groove, the fixing part fixes the baffle plate to the socket section, the compression spring sheathes the socket section and elastically abuts against between a bottom of the groove and the baffle plate, and the threaded section passes through the second through slot and is screwed in the locking hole.

10. The gimbal structure according to claim 1, wherein the fixing bracket comprises a first clamping plate, a second clamping plate and an arc rail component clamped between the first clamping plate and the second clamping plate, and the arc rail slot is defined on an inner side of the arc rail component.

11. The gimbal structure according to claim 10, further comprising an adjustment component, at least one of the first clamping plate and the second clamping plate comprising a recessed groove defined corresponding to the arc rail component, the adjustment component comprising a knob, a hollow stud and a push block, wherein the hollow stud is fixed to an end of the recessed groove, the push block is accommodated in the recessed groove, the push block comprises a hollow hole and an abutting slope extending and abutting the arc rail component to press the arc slide rail and gradually increasing a thickness in the direction away from the hollow stud, one end of the knob passes through the hollow hole and is fixed to the hollow stud, and another end of the knob is exposed from the first clamping plate.

* * * * *